United States Patent
Hamblet

(10) Patent No.: US 12,513,519 B2
(45) Date of Patent: Dec. 30, 2025

(54) METHODS AND SYSTEMS FOR PUSHING DATA TO CLIENT DEVICES OVER A TELECOMMUNICATIONS DATA NETWORK

(71) Applicant: Teal Communications, Inc., Bellevue, WA (US)

(72) Inventor: Robert Martin Hamblet, Sammamish, WA (US)

(73) Assignee: TEAL COMMUNICATIONS, INC., Seattle, WA (US)

(*) Notice: Subject to any disclaimer, the term of this patent is extended or adjusted under 35 U.S.C. 154(b) by 722 days.

(21) Appl. No.: 17/578,090

(22) Filed: Jan. 18, 2022

(65) Prior Publication Data

US 2023/0232224 A1 Jul. 20, 2023

(51) Int. Cl.
| | |
|---|---|
| *H04W 12/06* | (2021.01) |
| *H04W 4/14* | (2009.01) |
| *H04W 12/72* | (2021.01) |
| *H04W 12/73* | (2021.01) |

(52) U.S. Cl.
CPC ........... *H04W 12/068* (2021.01); *H04W 4/14* (2013.01); *H04W 12/72* (2021.01); *H04W 12/73* (2021.01)

(58) Field of Classification Search
CPC .......... H04L 2209/80; H04L 63/0853; H04W 12/068; H04W 12/73; H04W 12/72; H04W 4/14; H04W 12/35
See application file for complete search history.

(56) References Cited

U.S. PATENT DOCUMENTS

| | | | |
|---|---|---|---|
| 7,774,602 B2* | 8/2010 | O'Brien | H04L 63/08 380/278 |
| 8,850,200 B1* | 9/2014 | Horgan | H04L 63/126 713/168 |
| 9,408,012 B2* | 8/2016 | Li | H04W 8/20 |
| 10,425,118 B2* | 9/2019 | Yang | H04W 12/0431 |
| 10,659,954 B2 | 5/2020 | Hamblet | |
| 10,887,103 B2* | 1/2021 | Lu | H04L 63/0807 |
| 11,102,017 B2* | 8/2021 | Yang | H04W 4/70 |
| 11,190,933 B2* | 11/2021 | Hamblet | H04W 12/03 |
| 11,917,508 B2* | 2/2024 | Holmes | H04W 4/60 |
| 2004/0203581 A1 | 10/2004 | Sharon et al. | |

(Continued)

FOREIGN PATENT DOCUMENTS

| | | |
|---|---|---|
| CN | 106899540 | 6/2017 |
| CN | 107979835 | 5/2018 |

(Continued)

OTHER PUBLICATIONS

Jing, Jin, Abdelsalam Sumi Helal, and Ahmed Elmagarmid. "Client-server computing in mobile environments." ACM computing surveys (CSUR) 31.2 (1999): 117-157. (Year: 1999).*

(Continued)

*Primary Examiner* — Lizbeth Torres-Diaz
(74) *Attorney, Agent, or Firm* — Davis Wright Tremaine LLP; George C. Rondeau, Jr.; Heather M. Colburn

(57) ABSTRACT

Methods and/or systems for pushing data to identity components installed in the client devices. The systems include a credential management server, a network modem, and/or an identity component. The methods include establishing communications between a credential management server and an identity component.

21 Claims, 11 Drawing Sheets

(56) References Cited

U.S. PATENT DOCUMENTS

| | | | |
|---|---|---|---|
| 2009/0025080 A1* | 1/2009 | Lund | H04L 63/166 726/15 |
| 2010/0017597 A1 | 1/2010 | Chandwani | |
| 2010/0293257 A1* | 11/2010 | Kinnear, Jr. | H04L 61/5076 709/221 |
| 2011/0162001 A1* | 6/2011 | Mehta | G06Q 30/02 725/32 |
| 2013/0212248 A1 | 8/2013 | Neafsey et al. | |
| 2013/0217361 A1 | 8/2013 | Mohammed et al. | |
| 2014/0031012 A1 | 1/2014 | Park et al. | |
| 2014/0349617 A1 | 11/2014 | Li et al. | |
| 2016/0227431 A1* | 8/2016 | Alisawi | H04W 28/0221 |
| 2017/0127264 A1 | 5/2017 | Yang et al. | |
| 2017/0142121 A1 | 5/2017 | Lee et al. | |
| 2017/0338954 A1* | 11/2017 | Yang | H04W 12/35 |
| 2018/0352425 A1 | 12/2018 | Vasudevan et al. | |
| 2018/0376325 A1 | 12/2018 | Xu et al. | |
| 2019/0007525 A1 | 1/2019 | Smith, II et al. | |
| 2019/0037335 A1 | 1/2019 | Steck | |
| 2019/0058989 A1 | 2/2019 | Park et al. | |
| 2019/0104401 A1 | 4/2019 | Park et al. | |
| 2019/0297079 A1 | 9/2019 | Delcourt et al. | |
| 2020/0288300 A1* | 9/2020 | Oswal | H04W 8/205 |
| 2020/0304327 A1* | 9/2020 | Yang | H04L 9/3239 |
| 2021/0314148 A1* | 10/2021 | Yang | H04W 12/43 |
| 2023/0370841 A1* | 11/2023 | Gundavelli | H04W 12/04 |
| 2024/0224021 A1* | 7/2024 | An | H04W 8/205 |
| 2024/0314560 A1* | 9/2024 | Gundavelli | H04W 12/06 |

FOREIGN PATENT DOCUMENTS

| | | |
|---|---|---|
| CN | 108848496 | 11/2018 |
| CN | 109257740 | 1/2019 |
| KR | 20160061846 | 6/2016 |
| WO | 2013/169484 | 11/2013 |

OTHER PUBLICATIONS

Search Opinion, dated Jul. 31, 2020, received in Danish Patent Application No. PA 2020 70061.

International Search Report and Written Opinion, dated Jun. 22, 2023, received in International Application No. PCT/US 23/60584.

* cited by examiner

METHODS AND SYSTEMS FOR PUSHING DATA TO CLIENT DEVICES OVER A TELECOMMUNICATIONS DATA NETWORK

BACKGROUND

Technical Field

The present invention is directed generally to methods and systems that provide data to client devices, and more particularly, to systems in which a credential management server pushes data to identity components installed in the client devices.

Description of the Related Art

A telecommunications carrier data network includes devices and underlying infrastructure that transmit data from a first device to a different second device. Inside a carrier data network, a credential management server (e.g., an embedded subscriber identity module ("eSIM") platform) occasionally has data (e.g., an update, a profile, etc.) that must be uploaded to a particular one of a plurality of client devices (e.g., a cellular telephone device) operating in the carrier data network. But the credential management server cannot establish a data channel with the particular client device without first determining where the particular client device is located within the carrier data network. In other words, the credential management server needs a network address associated with the particular client device to use to send the data to the particular client device. To solve this problem, the particular client device may establish a data channel with the credential management server over the carrier data network. Then, the credential management server may send the data to the particular client device over the data channel.

Presently, the particular client device may establish the data channel with the credential management server in one of two ways. First, the credential management server may send a Short Message Service ("SMS") message to the particular client device, which, after receiving the SMS message, may initiate the data channel with the credential management server. Second, the particular client device may poll the credential management server for the data and initiate the data channel with the credential management server when the credential management server has data to upload to the particular client device. Using the second method, the particular client device connects with the credential management server regardless of whether the credential management server has any data to upload to the particular client device. The polling may be accomplished using a timer and an application executing inside of an eSIM installed in the particular client device. Examples of the second method are provided in U.S. patent application Ser. No. 16/265,708, filed on Feb. 1, 2019, and titled eSIM MANAGEMENT PLATFORM CONFIGURED TO BE POLLED BY AN ESIM CARD, now U.S. Pat. No. 11,190,933, which is incorporated herein by reference in its entirety.

BRIEF DESCRIPTION OF THE SEVERAL VIEWS OF THE DRAWING(S)

Various embodiments in accordance with the present disclosure will be described with reference to the following drawings.

FIG. 1 is a functional block diagram of a system that includes a plurality of client devices, one or more credential management servers, and a network address server each connected to a network (e.g., a telecommunications carrier data network).

FIG. 2A is a sequence diagram illustrating example communication occurring between a data network gateway, the network address server, and the credential management server(s) when the network address server has the authority to assign a network address to an identity component of a particular one of the plurality of client devices and associates the network address with a network identifier associated with the particular client device.

Figure 3A:
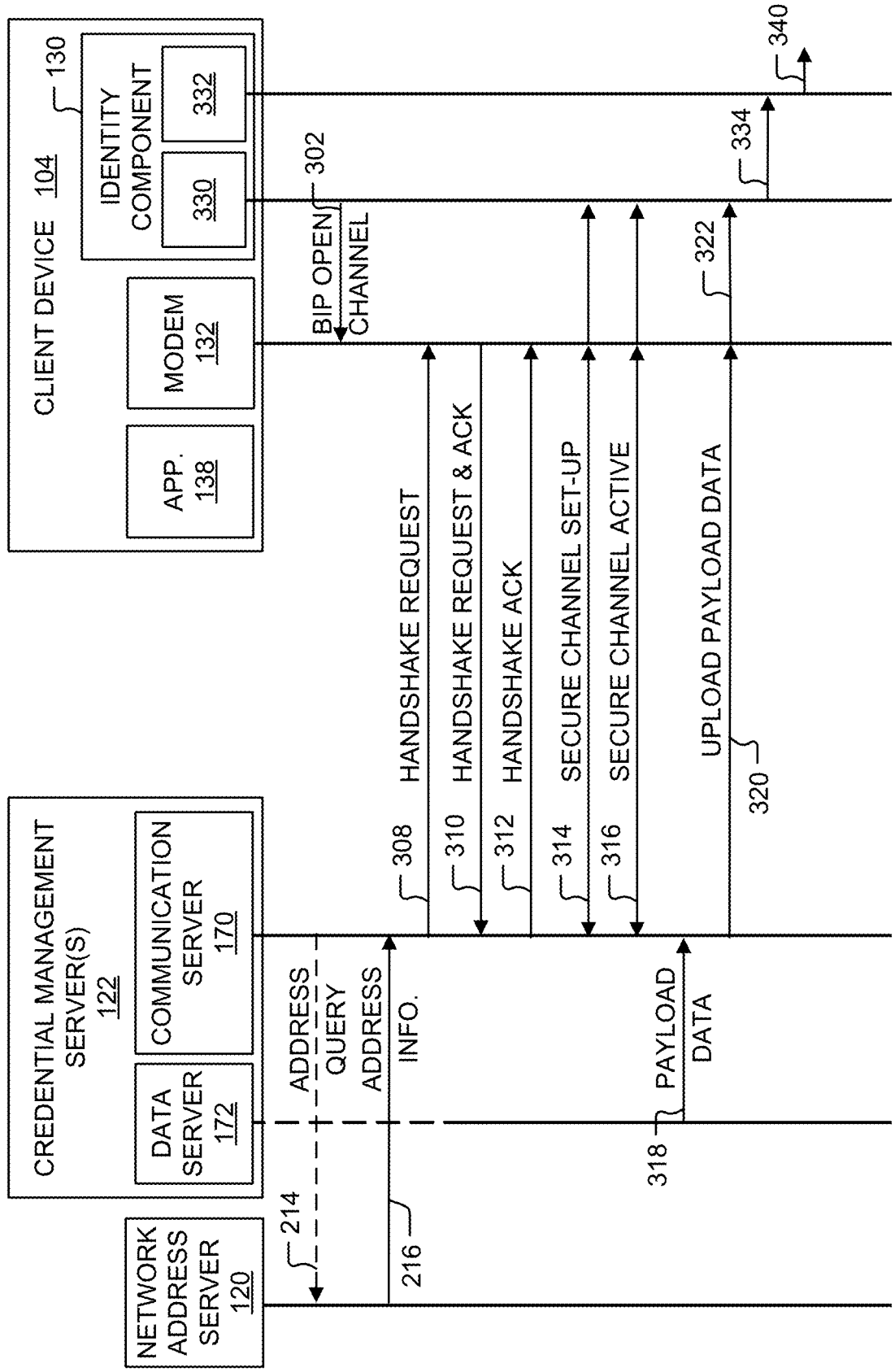
FIG. 3A is a sequence diagram illustrating example communication occurring during the establishment of a data channel over the network between the communication server and a modem of the client device using a three-way handshake process.
Figure 3B:
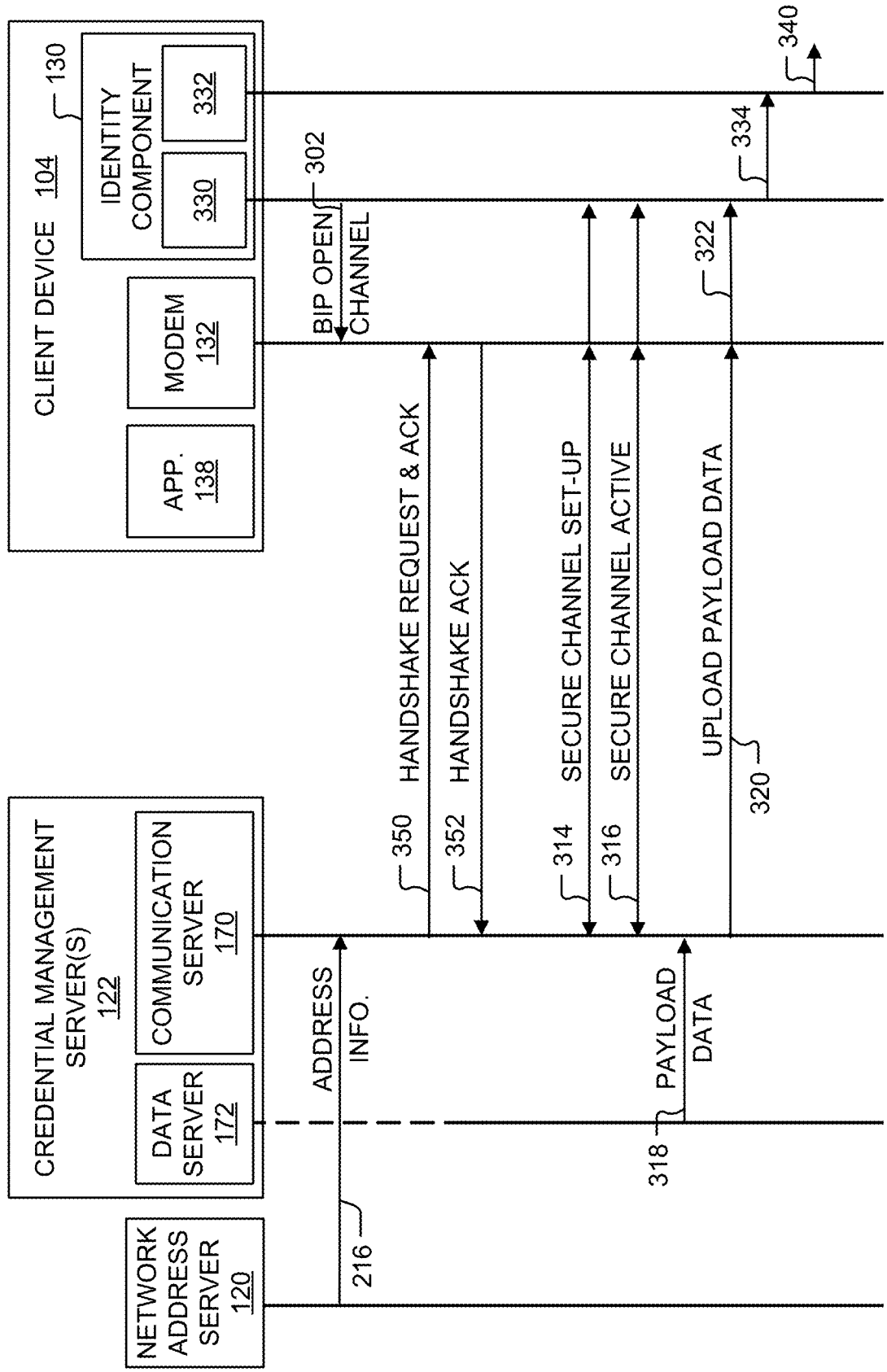
FIG. 3B is a sequence diagram illustrating example communication occurring during the establishment of the data channel over the network between the communication server and the modem of the client device using a two-way handshake process.
Figure 3C:
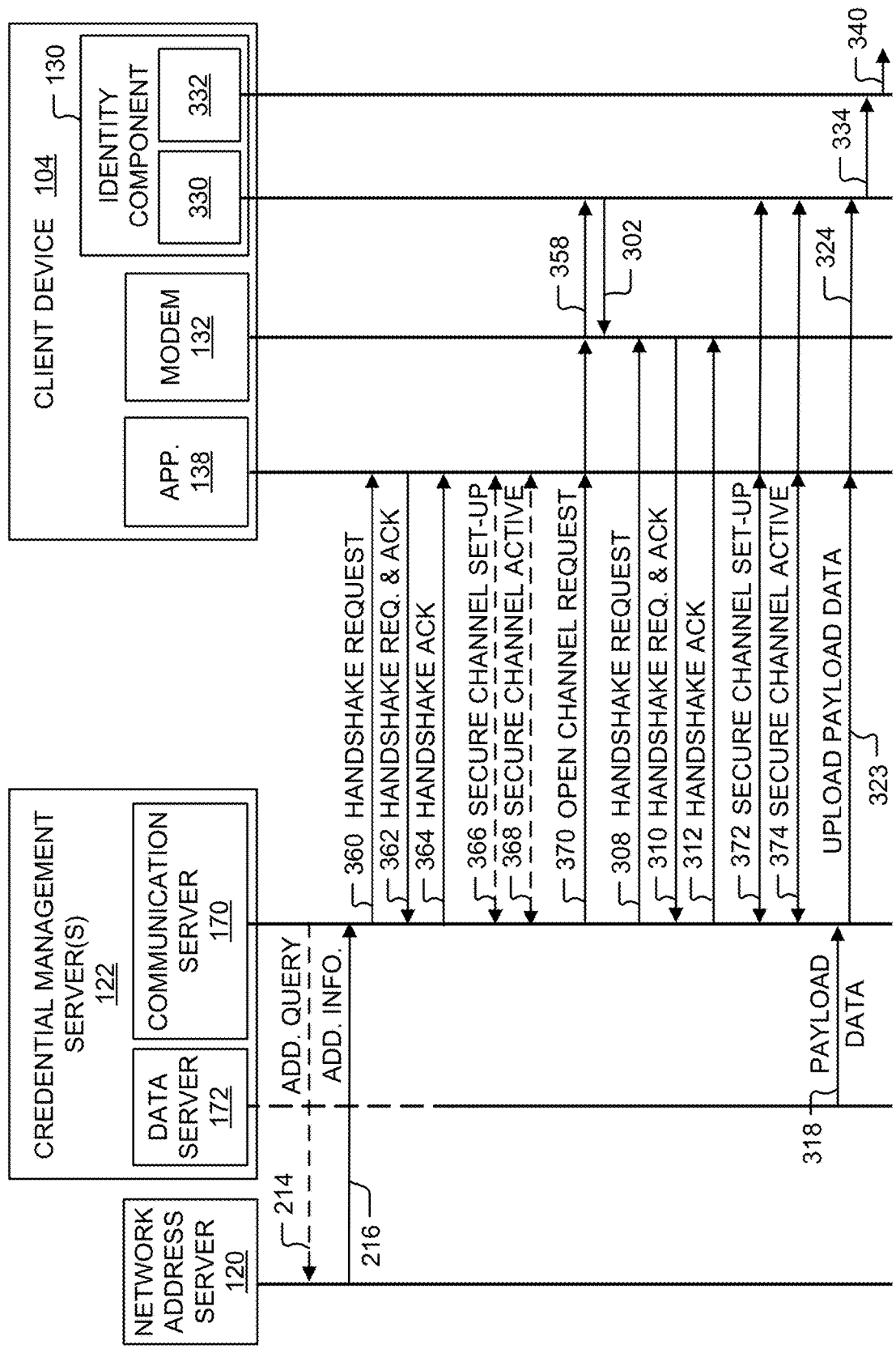

FIG. 3C is a sequence diagram illustrating example communication occurring during the establishment of a first data channel over the network between the communication server and an application of the client device using the three-way handshake process, and a second data channel over the network between the communication server and the modem of the client device using the three-way handshake process.

Figure 3D:
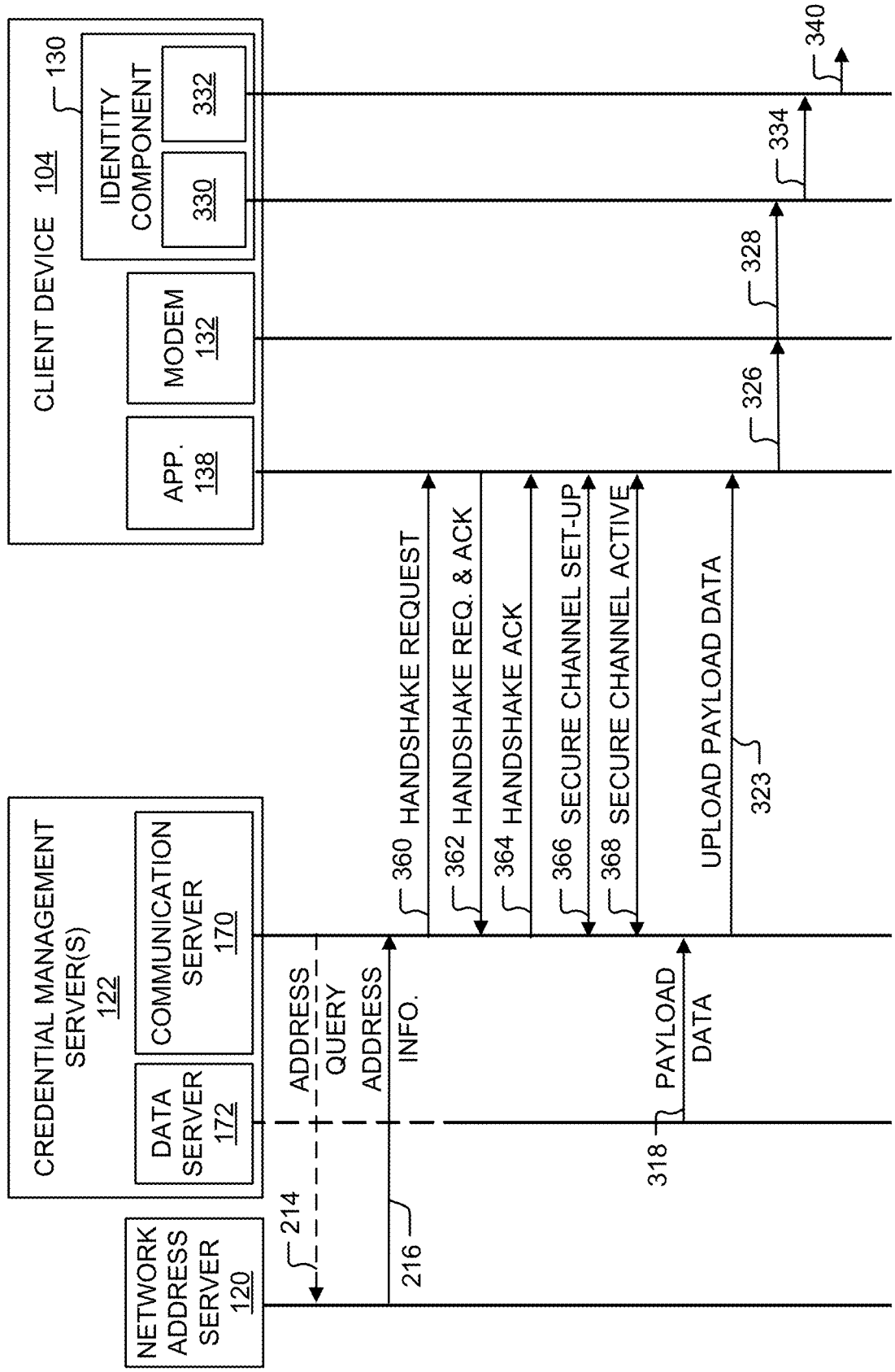

FIG. 3D is a sequence diagram illustrating example communication occurring during the establishment of a data channel over the network between the communication server and an application of the client device using the three-way handshake process.

Figure 1:
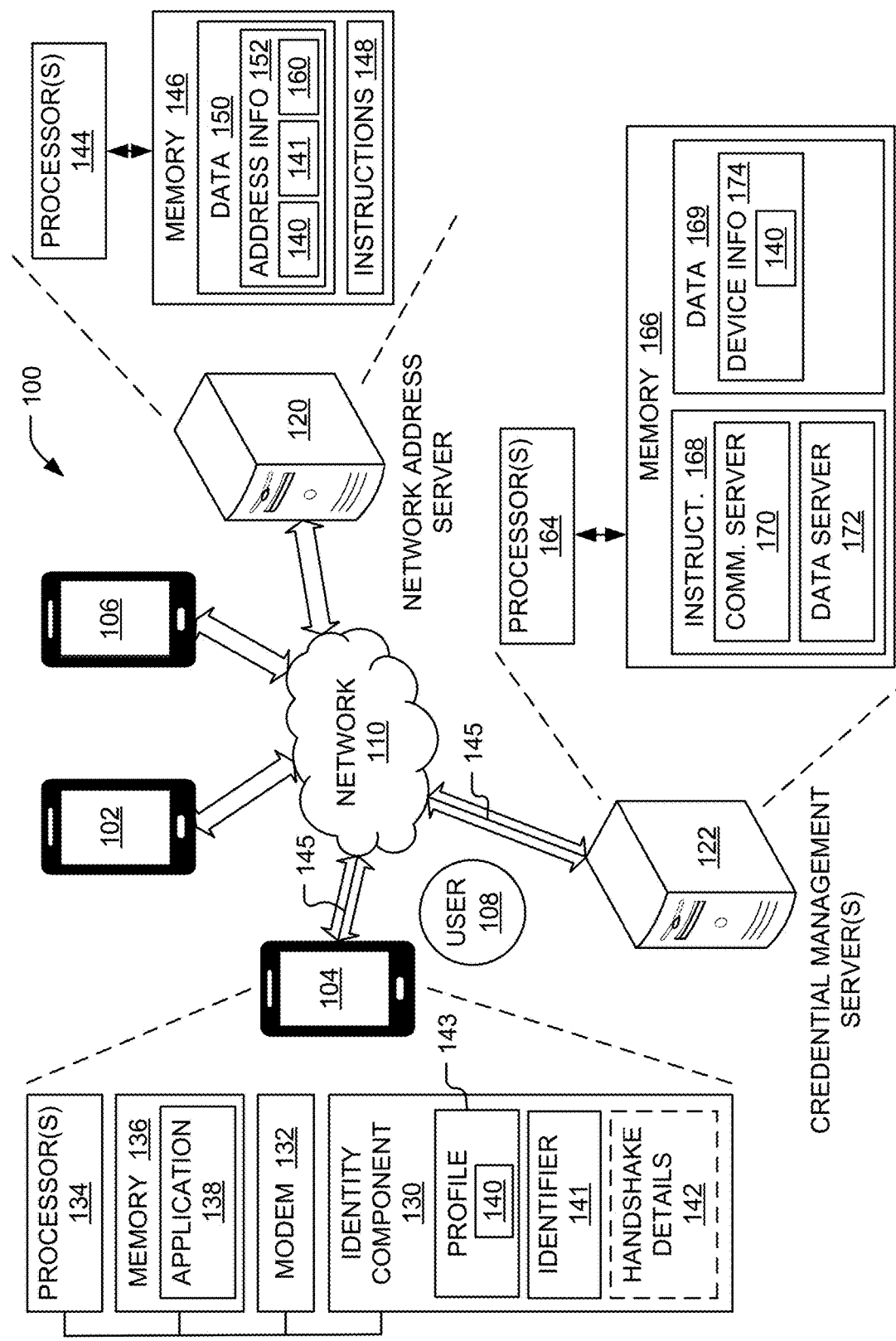
Figure 4A:
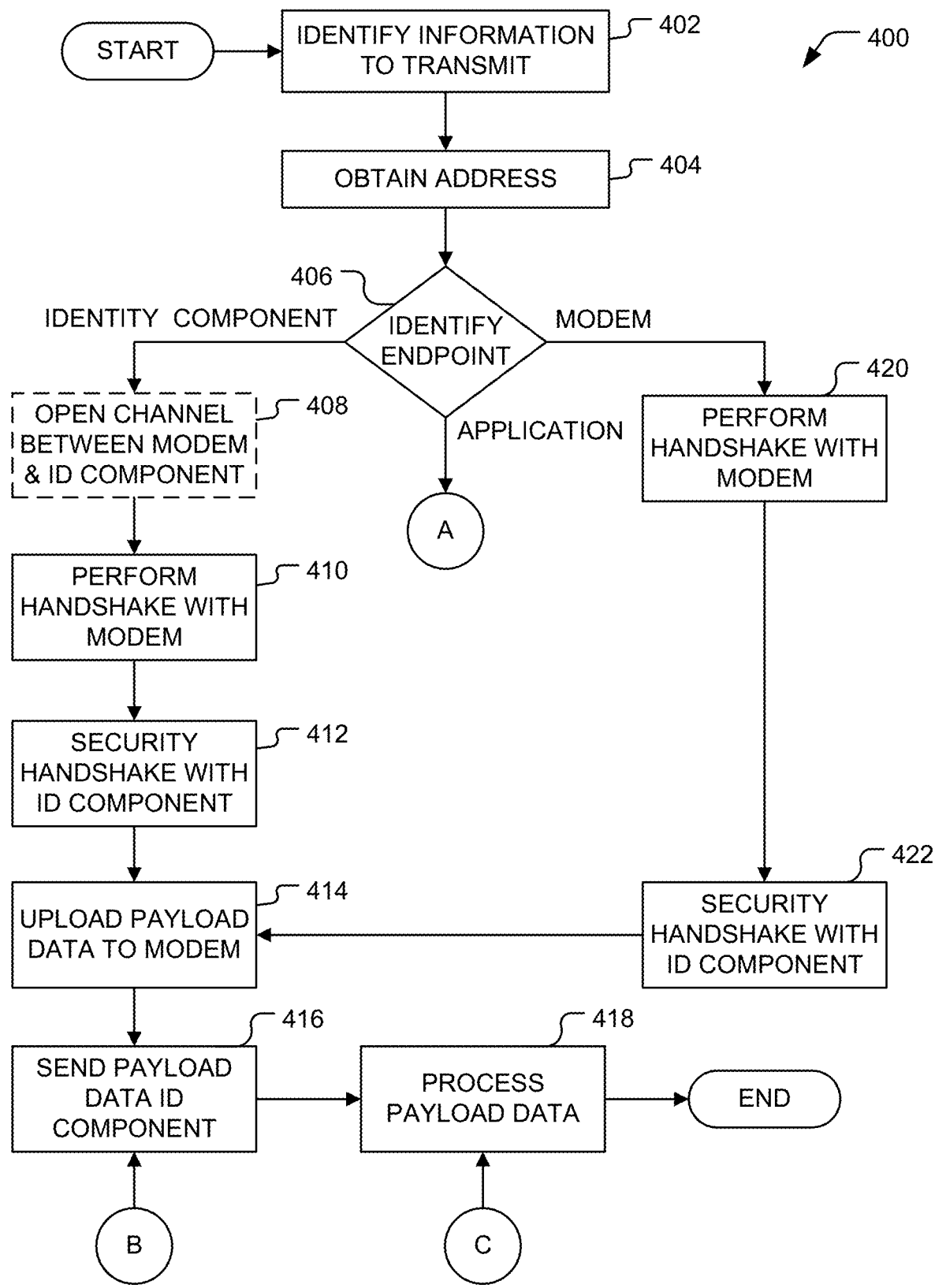

FIG. 4A is a flow diagram of a first portion of a method performed by the system of FIG. 1.

Figure 4B:
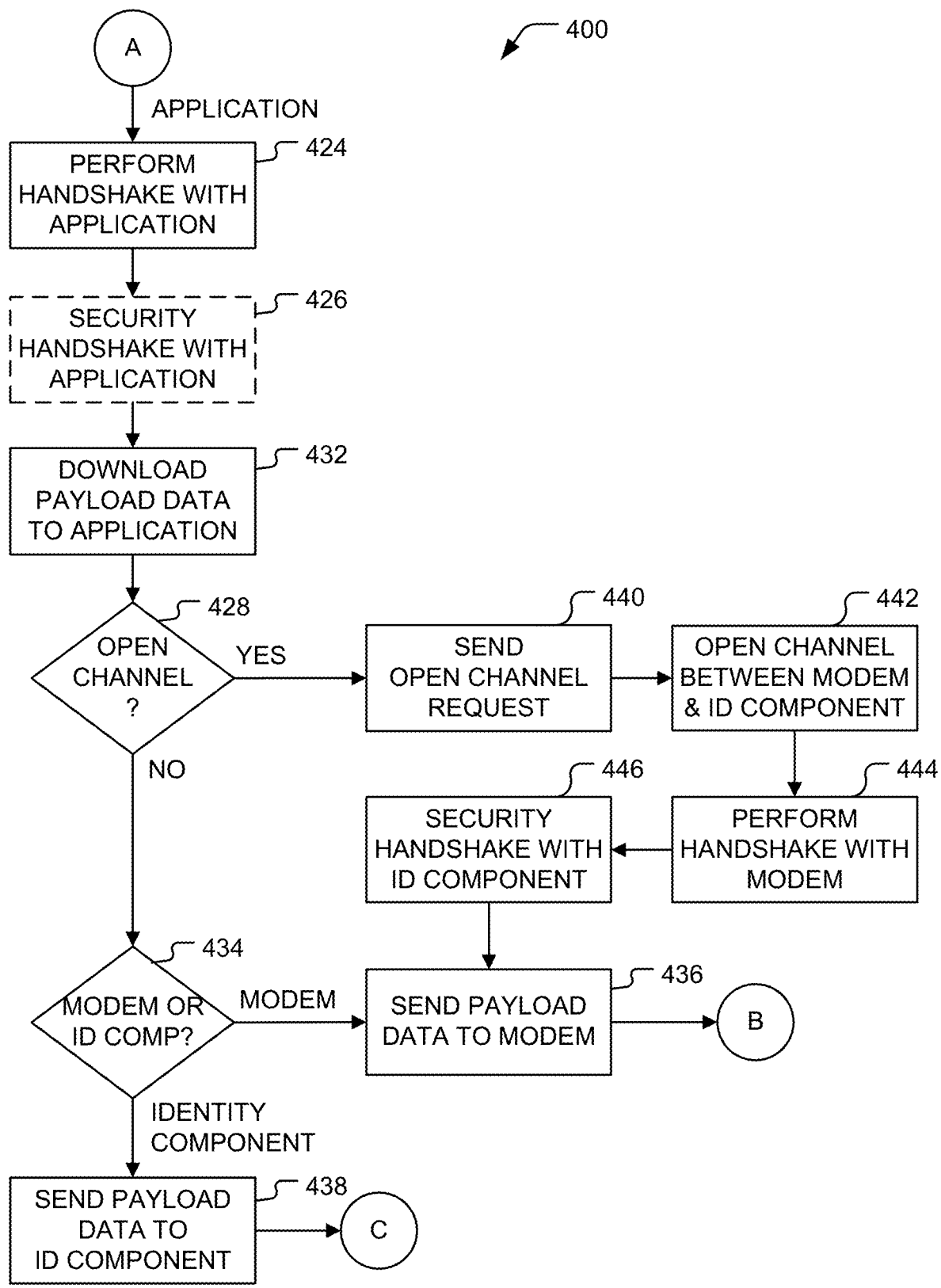

FIG. 4B is a flow diagram of a second portion of the method of FIG. 4A.

Figure 5:
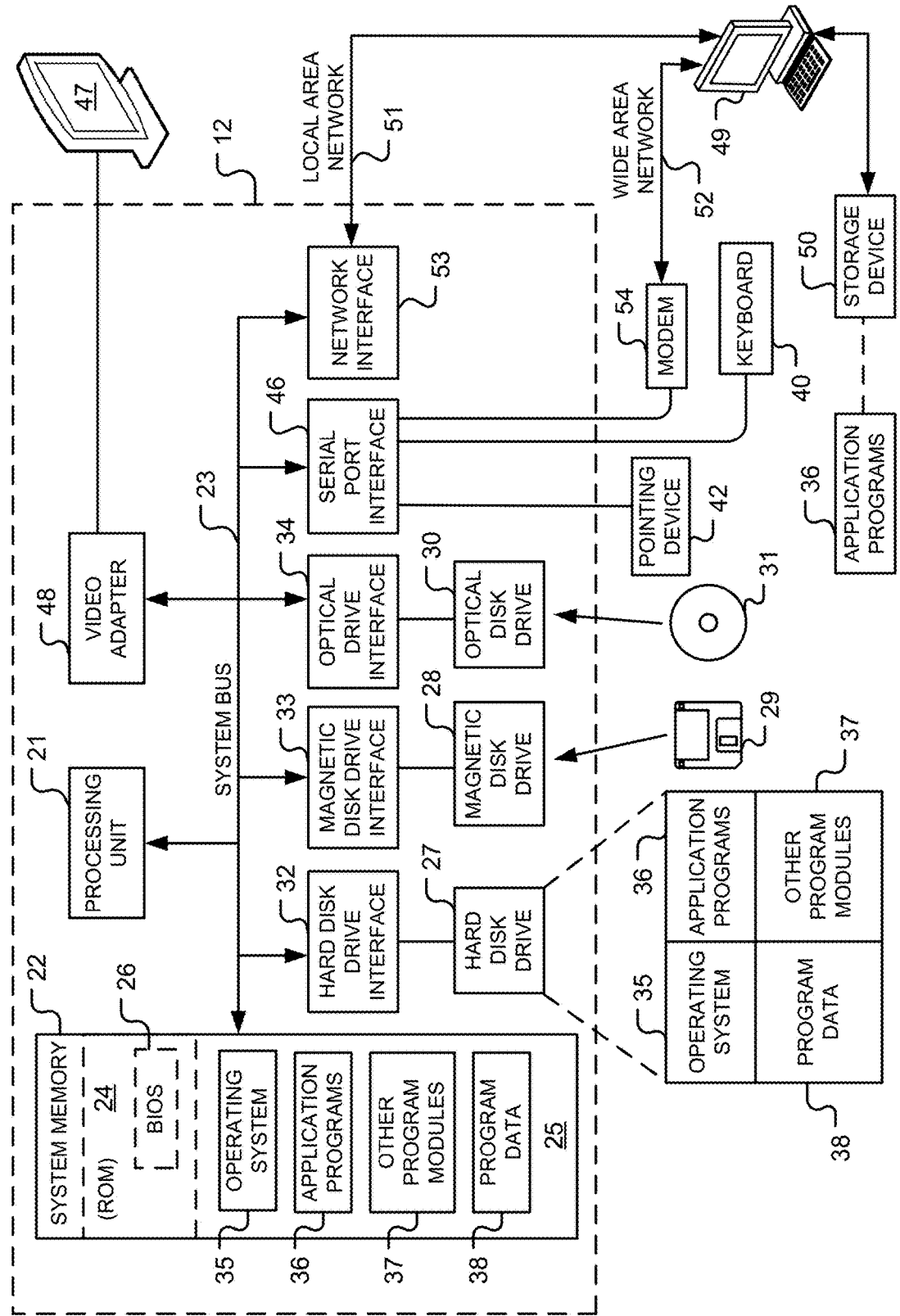

FIG. 5 is a diagram of a hardware environment and an operating environment in which the computing devices of the system of FIG. 1 may be implemented.

Figure 6:
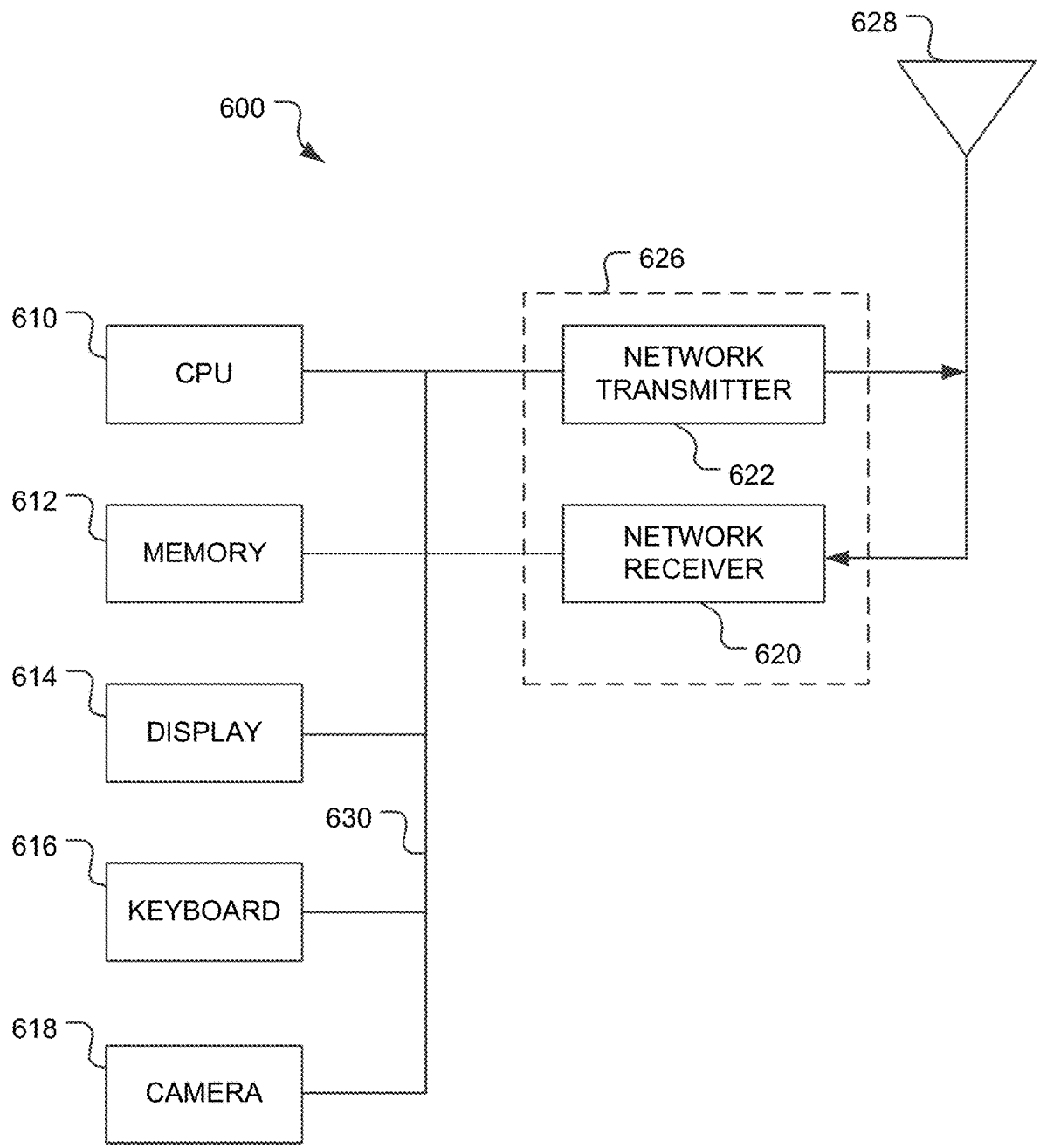

FIG. 6 is a functional block diagram illustrating an exemplary mobile communication device that may be used to implement each of the plurality of client devices of FIG. 1.

Like reference numerals have been used in the figures to identify like components.

DETAILED DESCRIPTION

FIG. 1 is a functional block diagram of a system 100 that includes a plurality of client devices 102-106 connected to a network 110 (e.g., a telecommunications carrier data network). The system 100 also includes a network address server 120 optionally connected to the network 110 and one or more credential management servers 122 each connected to the network 110. The credential management server(s) 122 may communicate with the client devices 102-106 and the network address server 120 over the network 110. The network address server 120 may communicate with the client devices 102-106 and the credential management server(s) 122 over the network 110. The client devices 102-106 may communicate with one another, the credential management server(s) 122, and/or the network address server 120 over the network 110.

Each of the client devices 102-106 may be implemented generally as a wireless networked device, such as an Internet of Things ("IoT") device, a cellular enabled device, a satellite enabled device, a LORA enabled device, a Point-to-Point enabled device, a WiFi enabled device, and/or a Bluetooth enabled device. For example, one or more of the client devices 102-106 may each be enabled as a mobile communication device 600 illustrated in FIG. 6. By way of another non-limiting example, at least some of the client devices 102-106 may each be implemented as devices (e.g., vehicles) configured for machine-to-machine ("M2M") communication and/or to communicate on the internet or other data network. For ease of illustration, FIG. 1 includes only the three client devices 102-106. However, the system 100 may include any number of devices each like the client device 104.

Also, for ease of illustration, only the client device 104 will be described in detail but each of the client devices 102-106 may be functionally identical to client device 104 and may have substantially identical components to the client device 104. Additionally, for ease of illustration, the client device 104 has been illustrated as being operated by a user 108. By way of a non-limiting example, the user 108 may manage operations of identity components (e.g., an identity component 130) installed in one or more of the client devices 102-106. The client device 104 may be configured to execute an Internet browser, a sensor application, a communication application, and the like.

The client device 104 includes the identity component 130, a wireless network modem 132, one or more processors 134, and memory 136 storing an application 138. The identity component 130 may be implemented as an embedded subscriber identity module ("eSIM") card. By way of non-limiting examples, the identity component 130 (e.g., an eSIM card) may be implemented as an embedded chip (e.g., soldered on a board), a plastic card (e.g., inserted into the client device 104), and the like. The identity component 130 may have a plastic card format, such as a Universal Integrated Circuit Card ("UICC"), an embedded UICC ("eUICC"), and the like. The identity component 130 may be implemented on or as an embeddable chip, such as an UICC, an eUICC, and the like. The identity component 130 may be integrated into silicon. For example, the identity component 130 may be implemented on or as an integrated memory package included within a System on a Chip ("SoC"). Examples of a SoC that may function as or include the identity component 130 include an integrated eUICC ("ieUICC" or "iUICC"), an integrated SIM ("iSIM"), and the like. By way of another non-limiting example, the identity component 130 may be implemented within the processor 134 (e.g., as a central processing unit 610 illustrated in FIG. 6), and/or the memory 136 (e.g., as memory 612 illustrated in FIG. 6) of the client device 104. Thus, the identity component 130 may be implemented as a portion of the processor 134 and/or a portion of the memory 136. The identity component 130 may be implemented within memory that is integrated or non-integrated with the client device 104. The memory implementing the identity component 130 may be removable or non-removable from the client device 104. For example, the memory may include the memory 136. The identity component 130 may be configured to be updated wirelessly with one or more different network operator profiles that include settings required to connect to a particular data network. Optionally, the client device 104 and/or the identity component 130 may be configured to prevent the removal of the identity component 130 from the client device 104 (e.g., by the user 108).

The identity component 130 stores or has access to information (e.g., a network identifier 140, an identifier 141 of a destination network, optional server handshake details 142, and the like) that includes network credentials used to inform the network 110 about the identity of the client device 104. The network identifier 140 may be implemented as an International Mobile Subscriber Identity ("IMSI"), a User ID ("UID" or "UUID"), a Subscription Permanent Identifier ("SUPI"), a Subscription Concealed Identifier ("SUCI"), a Cryptographic Certificate, and the like. The network identifier 140 may uniquely identify a subscriber (e.g., the user 108), the client device 104, and/or the identity component 130 on the destination network (e.g., the network 110). The network identifier 140 may be stored in a profile 143 stored by the identity component 130. By way of non-limiting examples, the profile 143 may be implemented as an operational profile or a provisioning profile. The profile 143 includes one or more applications configured to access the network 110 and any network credentials required by the network 110, such as the network identifier 140. The identity component 130 may store or have access to the optional server handshake details 142.

The identity component 130 may include circuitry that is connectable to a data channel 145 initiated by the credential management server(s) 122. The circuitry receives information from the credential management server(s) 122 over the data channel 145. The data channel 145 may be initiated by the credential management server(s) 122 other than by a Short Message Service ("SMS") message. The circuitry may be connected to the modem 132 and receive the information over the data channel 145 via the modem 132. The circuitry may include memory that stores the network identifier 140, which is provided to the credential management server(s) 122 before the credential management server(s) 122 initiates the data channel 145.

The modem 132 may be installed within or connected to the client device 104. The modem 132 may be implemented as a cellular data modem configured to communicate over the network 110. The modem 132 may include modem circuitry that is connectable to the identity component 130. The modem circuitry may receive inbound information from the credential management server(s) 122 over the data channel 145, and pass the inbound information to the identity component 130. The modem circuitry may be connectable to a wireless receiver (e.g., a network receiver 620, a network transceiver 626, and the like illustrated in FIG. 6) and to receive the inbound information from the wireless receiver. The modem circuitry may include at least one processor and memory storing instructions that are executable by the at least one processor. The instructions, when executed by the at least one processor, may cause the at least one processor to set up a channel (e.g., a channel 302 illustrated in FIGS. 3A-3C) between the modem 132 and the identity component 130. The instructions, when executed by the at least one processor, may cause the at least one processor to determine the inbound information is to be passed to the identity component 130 based on routing information included in the inbound information. The routing information may include an addressable port, a protocol identifier, or a payload identifier. The instructions, when executed by the at least one processor, may cause the at least one processor to receive at least one instruction from an application executing on the identity component 130. The at least one instruction may instruct the at least one processor to route the inbound information to the identity component 130.

The processor(s) 134 may be implemented as the central processing unit ("CPU") 610 (see FIG. 6). The memory 136 may be implemented as memory 612 (see FIG. 6). As mentioned above, the memory 136 stores the application 138. The application 138 may include instructions and optionally data. The instructions are executable by the processor(s) 134 and, when executed, implement the application 138. The application 138 may be included within the software of the client device 104, within the software of a component connected to the client device 104 (such as a USB adapter or board hat), or inside the software of the modem 132 itself.

The network 110 may be implemented as a carrier data network, a cellular network, the Plain Old Telephone System ("POTS"), the Internet, a wide-area network ("WAN"), a local area network ("LAN"), a private data network (such as a virtual private network ("VPN")), and/or another type of network. Further, the network 110 may include two or more networks connected to one another.

The network address server 120 may be one of many network address servers operable in or connected to the network 110. The network address server 120 may be implemented as a computing device 12 (see FIG. 5). By way of non-limiting examples, the network address server 120 may be implemented as an Internet Protocol ("IP") address assignment server (e.g., a Dynamic Host Configuration Protocol ("DHCP") Server), a Remote Authentication Dial-In User Service ("RADIUS") server, and the like. The network address server 120 may be integrated with a single network, or across multiple networks so that a real time location of the client device 104 may be tracked as the client device 104 switches from one network to another network. In some embodiments, the network address server 120 may be a component of one or more of the credential management server(s) 122. The network address server 120 includes one or more processors 144 and memory 146 storing instructions 148 and data 150. The processor(s) 144 may be implemented as a processing unit 21 (see FIG. 5).

The memory 146 may be implemented as system memory 22 (see FIG. 5). As mentioned above, the memory 146 stores the instructions 148 and the data 150. The instructions 148 are executable by the processor(s) 144. The data 150 includes a plurality of network addresses each associated with a network identifier and a destination network. In the example illustrated, the data 150 includes network address information 152, which includes a network address 160 that is associated with the network identifier 140 and the identifier 141 of the destination network. Thus, the instructions 148 may instruct the processor(s) 144 to match the network identifier 140 and the identifier 141 to the connectable network address 160 (such as an IP address).

Each of the credential management server(s) 122 may be implemented as the computing device 12 (see FIG. 5). The credential management server(s) 122 has/have one or more processors 164 and memory 166. The memory 166 stores instructions 168 and data 169. In the embodiment illustrated, the instructions 168 implement a communication server 170 and a data server 172 (e.g., a Subscription Manager Data Preparation ("SM-DP") server). However, in alternate embodiments, each of the communication server 170 and the data server 172 may be implemented on different ones of the credential management server(s) 122. The data 169 stores device information 174, which includes the network identifier 140 associated with the client device 104. The memory 166 may be implemented using any of the components suitable for implementing the memory 146 (discussed above).

The processor(s) 164 may be implemented using any of the components suitable for implementing the processor(s) 144 (discussed above). The processor(s) 164 of the credential management server(s) 122 (e.g., an eSIM platform) execute(s) the instructions 168, which transmit data to the client device 104 that manages the connection settings of the identity component 130, including identity management and other details that may impact the client-side use of the network 110. Non-limiting examples of types of data that may be transmitted by the credential management server(s) 122 to the client device 104 are listed in Table A below:

TABLE A

| Type of Data |
| --- |
| eSIM operations |
| Cellular network credentials |
| Non-cellular network credentials, including for example credentials for one or more satellite networks, credentials one or more Wi-Fi networks, credentials one or more Bluetooth networks, credentials one or more Long Range ("LoRa") networks, and/or the like |
| Identity component applications |
| Identity component operating system ("OS") data |
| Application credentials, such as Transport Layer Security ("TLS") certificates, passkeys, and/or the like |
| General cryptographic information, such as certificates, tokens, hashes, strings, addresses, and/or the like |

By way of a non-limiting example, the communication server 170 may be implemented as a Subscription Manager Secure Routing ("SM-SR") server, an eSIM subscriber management platform, and the like. By way of another non-limiting example, referring to FIG. 1, the communication server 170 may be implemented using software sold by IDEMIA (e.g., M-Connect Subscription Manager software), NordicESIM, Achelos, G+D, Gemalto, HOP, Morpho, a wireless carrier, or other eSIM subscription or platform provider. By way of other non-limiting examples, the communication server 170 may implement a short message service center ("SMSC") configured to communicate with the identity component 130 via Short Message Service ("SMS") messages, a Hypertext Transfer Protocol ("HTTP") server configured to communicate with the identity component 130 via HTTP messages, and the like. Thus, during a profile upload operation, an operational profile may be transmitted to the identity component 130 via an SMS message, HTTP message, and the like.

The data server 172 may implement a SM-DP server, or provide similar functionality. For example, the data server 172 may obtain (and encrypt) an operational profile for installation on the identity component 130 (e.g., an eUICC).

The credential management server(s) 122 include at least one processor (e.g., the processor(s) 164), and the memory 166 that stores the instructions 168, which are executable by the processor(s) 164. The instructions 168, when executed by the processor(s) 164, cause the processor(s) 164 to obtain the address information 152 from the network address server 120, initiate the data channel 145 with the identity component 130 using the address information 152, and send data to the identity component 130 over the data channel 145. The data channel 145 is initiated other than by a SMS message. The address information 152 is associated with the client device 104, which includes the identity component 130. The network address information may include an Internet Protocol ("IP") address of the client device 104.

As will be described below, initiating the data channel 145 may optionally include performing a handshake process with the modem 132 installed in the client device 104 or the application 138 executing on the client device. The instructions 168, when executed by the processor(s) 164, may cause the processor(s) 164 to perform a security handshake process with the identity component 130. Initiating the data channel 145 may include performing a first handshake process with the application 138, which is executing on the client device 104. The instructions 168, when executed by the processor(s) 164, may cause the processor(s) 164 to send an open channel request to the modem 132 installed in the client device 104 to thereby request the opening of the channel 302 (see FIGS. 3A-3C). The instructions 168, when executed by the processor(s) 164, may cause the processor(s) 164 to perform a first security handshake process with the application 138. The instructions 168, when executed by the processor(s) 164, may cause the processor(s) 164 to perform a second handshake process with the modem 132. The instructions 168, when executed by the processor(s) 164, may cause the processor(s) 164 to perform a second security handshake process with the identity component 130.

As mentioned above, the application 138 may include instructions and optionally data. The instructions of the application 138 may perform a method that includes receiving inbound information from the credential management server(s) 122 over the data channel 145 and providing the inbound information to the identity component 130. The inbound information may include any information sent by the credential management server(s) 122 to the client device 104, such as information of any of the types of data listed in Table A above. As will be described below, the method may optionally include performing a handshake process with the credential management server(s) 122 that was initiated by the credential management server(s) 122 other than by sending a SMS message to the client device 104. The method may include performing a security handshake process with the credential management server(s) 122. The method may optionally include receiving an open channel request from the credential management server(s) 122, and sending the open channel request to the modem 132 to thereby request the opening of the channel 302 (see FIGS. 3A-3C).

As mentioned above, the client device 104 may communicate over the network 110 using the profile 143 on the identity component 130. However, the user 108 may wish to make changes to the identity component 130. Such changes will be referred to as identity component operations. For example, the user 108 may wish to download an operational profile (not shown), which is configured to use a different cellular data network that is part of or connected to the network 110. Such an identity component operation will be referred to as a profile download operation. U.S. patent application Ser. No. 15/975,443, filed on May 9, 2018, and titled eSIM Subscription Management System, describes methods of performing a profile download operation. U.S. patent application Ser. No. 15/975,443 is incorporated herein by reference in its entirety.

As explained above, prior art credential management servers (e.g., eSIM Platforms) cannot establish a data channel over which to transmit data to a client device because such prior art credential management servers lack the knowledge of where the client device is located within the network. Therefore, to receive information (e.g., updates), the client device must first establish a data channel with the credential management server. Previously, this was accomplished by (1) the credential management server sending an SMS message to the client device requesting that the client device initiate a data channel, or (2) the client device occasionally polling the credential management server for any data to download.

The system 100 avoids the need for both the SMS message sent by the credential management server(s) 122 and polling by the client device 104 because the network address server 120 (such as an IP address assignment server) is connected to the communication server 170 (e.g., a SM-SR server), which is responsible for communications between the credential management server(s) 122 and the identity component 130. Thus, to communicate with the client device 104, the communication server 170 may simply lookup, in the device information 174 stored in the memory 166, the network identifier 140 associated with the client device 104 and forward the network identifier 140 to the network address server 120.

The network address server 120 may receive the network identifier 140 (e.g., from the credential management server(s) 122), lookup the address information 152 associated with the network identifier 140, and forward the address information 152 to the communication server 170 (e.g., implemented by the instructions 168). As mentioned above, the address information 152 includes the network address 160 associated with the network identifier 140 and may include the identifier 141 of the destination network. After receiving the address information 152, the communication server 170 may attempt to open the data channel 145 with the identity component 130 (e.g., an eSIM card) over which data may be transmitted. The network address 160 may be an IP address with or without port information. The identifier 141 of the destination network may be used to transmit the information relevant to the identity component 130 to the identity component 130 for storage thereby.

The communication server 170 may receive the network address 160 from the network address server 120 either in advance or in real-time. For example, the address information 152 may be received by the communication server 170 in real time along with a request to upload particular information to a named subscriber (e.g., the user 108). The request may be sent by the network address server 120. For example, the network address server 120 may receive an instruction including the network identifier 140 from another computing device (such as one of the credential management server(s) 122 or a different computing device, such as a data network gateway 202 illustrated in FIGS. 2A-2D) to provide the request to the credential management server(s) 122. The network address server 120 may look up the address information 152 associated with the network identifier 140, and forward the address information 152 to the communication server 170 along with the request to upload the particular information.

Alternatively, the communication server 170 may query the network address server 120 for the address information 152 when the communication server 170 is in the process of preparing the particular information for upload to the identity component 130. The communication server 170 may record the network address 160 and map the network address 160 to the identity component 130 at least for a predetermined amount of time (e.g., a duration of the upload). The particular information may pass through one or more other systems on its way to the communication server 170.

Figure 2A:
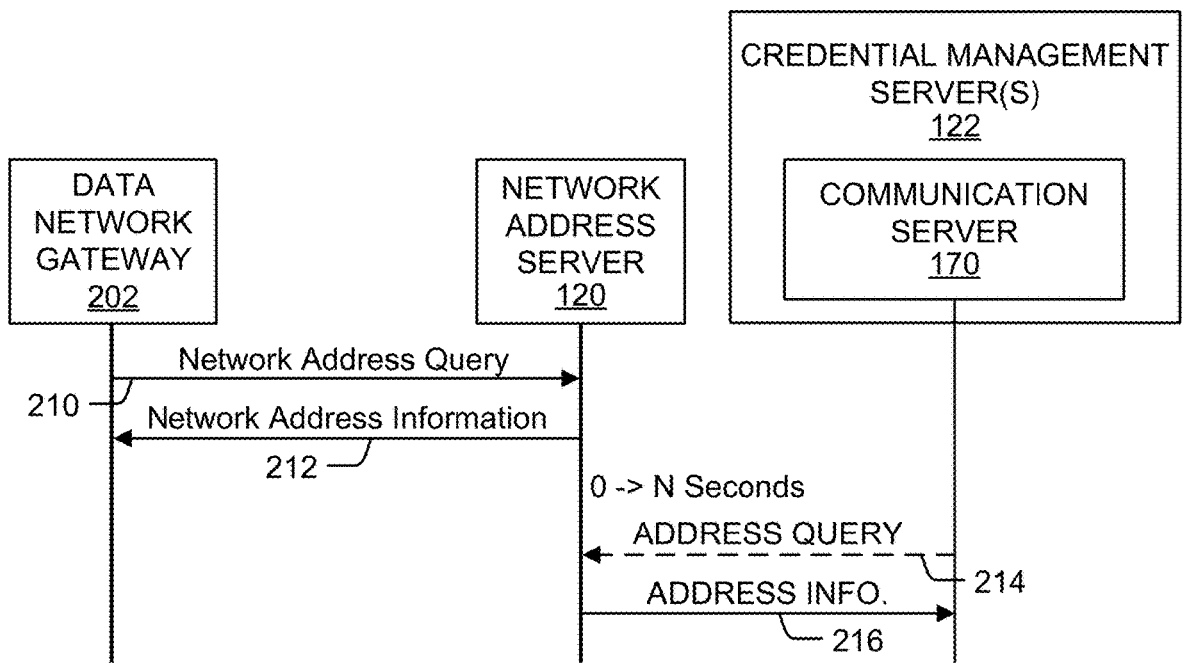
FIG. 2B is a sequence diagram illustrating example communication occurring between the data network gateway, the network address server, and the credential management server(s) when the network address server has the authority to push the network address (associated with the network identifier) to the data network gateway.
FIG. 2C is a sequence diagram illustrating example communication occurring between the data network gateway, the network address server, and the credential management server(s) when the network address server is implemented as a recording database that receives the network address from the data network gateway.
FIG. 2D is a sequence diagram illustrating example communication occurring between an external source, the network address server, and the credential management server(s) when the network address server is implemented as a recording database that receives the network address from the external source.

FIGS. 2A-2D illustrate different methods by which the network address server 120 may obtain the network address 160 before providing the network address 160 to the credential management server(s) 122. FIG. 2A is a sequence diagram illustrating example communication occurring between the data network gateway 202, the network address server 120, and the credential management server(s) 122 when the network address server 120 has the authority to assign the network address 160 to the identity component 130 and to associate the network address 160 with the network identifier 140 and, optionally, with the identifier 141 of the destination network. Referring to FIG. 2A, the data network gateway 202 sends a network address query to the network address server 120 in a transmission 210. The network address query includes the network identifier 140 and requests the network address 160 associated with the network identifier 140. When the network identifier 140 is not associated with a particular network address, the network address server 120 assigns a network address (e.g., the network address 160) to the network identifier 140 and transmits a transmission 212 to the data network gateway 202 in response to the network address query. On the other hand, when the network identifier 140 is associated with the network address 160, the network address server 120 looks up the network identifier 140, obtains the network address 160 associated with the network identifier 140, and transmits the transmission 212 to the data network gateway 202 in response to the network address query. The transmission 212 includes the network address 160 associated with the network identifier 140.

To obtain the network address 160 of the client device 104, the communication server 170 may optionally send an address query including the network identifier 140 in an optional transmission 214 to the network address server 120. The optional transmission 214, when sent, may be sent before or after the transmission 210 is received. After the optional transmission 214 is received by the network address server 120, the network address server 120 transmits a transmission 216 to the communication server 170. In embodiments in which the optional transmission 214 is omitted, the network address server 120 may transmit the transmission 216 to the communication server 170 without having first received an address query. The transmission 216 includes the address information 152. Before sending the transmission 216, the network address server 120 may look up the network identifier 140 (e.g., included in the address query) and identify the address information 152 associated with the network identifier 140. The transmission 216 may be sent after the transmission 210 is received and before the transmission 212 is sent, at the same time the transmission 212 is sent, or after the transmission 212 is sent (e.g., after N seconds have elapsed).

Figure 2B:
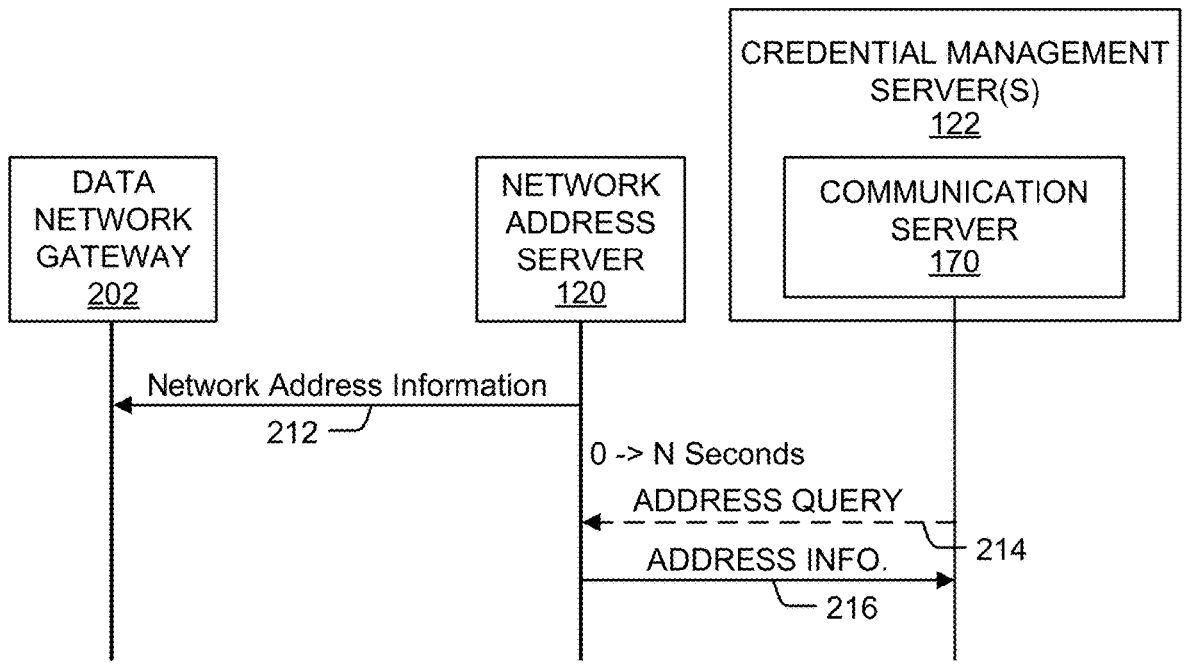

FIG. 2B is a sequence diagram illustrating example communication occurring between the data network gateway 202, the network address server 120, and the credential management server(s) 122 when the network address server 120 has the authority to push the network address 160 to the data network gateway 202 and associate the network address 160 with the network identifier 140 and optionally with the identifier 141 of the destination network. Referring to FIG. 2B, the network address server 120 sends the transmission 212 to the data network gateway 202 without having first received the network address query in the transmission 210 (see FIG. 2A). In other words, the transmission 210 is omitted in FIG. 2B. In the example illustrated, before the transmission 212 is sent, the network identifier 140 may not be associated with a particular network address. Therefore, the network address server 120 may assign a network address (e.g., the network address 160) to the network identifier 140 and transmit the transmission 212 to the data network gateway 202. The transmission 212 includes the network address 160 associated with the network identifier 140. Then, the optional transmission 214, when sent, and the transmission 216 may be sent and processed as described above. The optional transmission 214, when sent, may be sent before, at the same time, or after (e.g., N seconds after) the transmission 212 is sent. The transmission 216 may be sent before, after (e.g., N seconds after), or at the same time that the transmission 212 is sent.

Figure 2C:
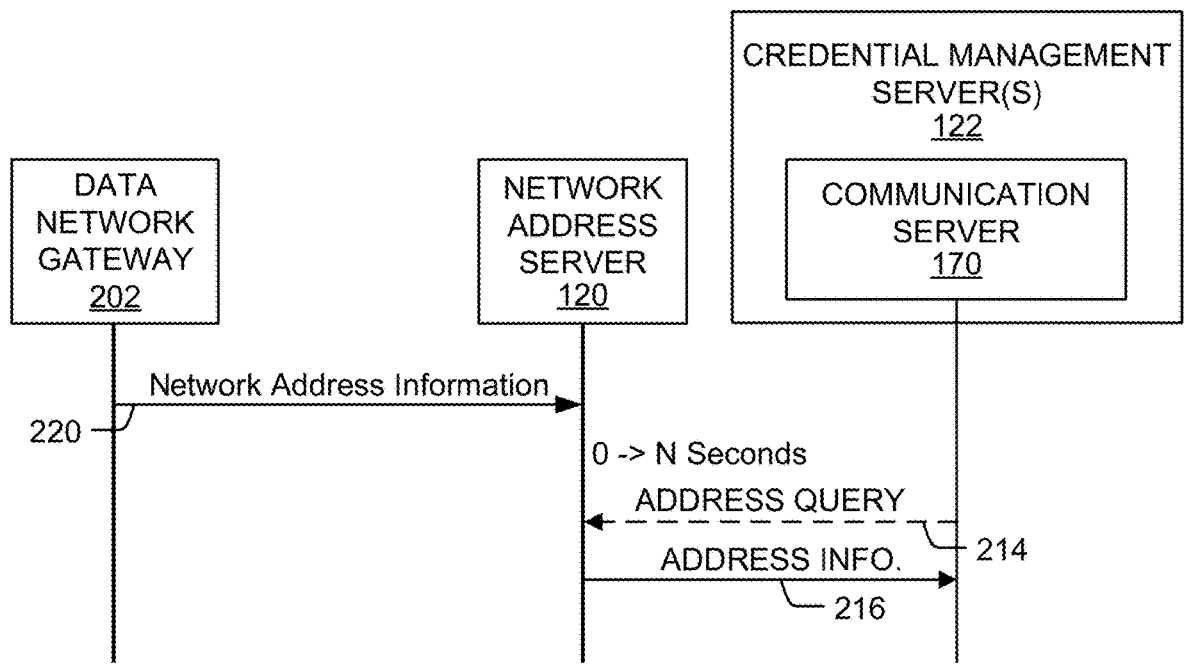

FIG. 2C is a sequence diagram illustrating example communication occurring between the data network gateway 202, the network address server 120, and the credential management server(s) 122 when the network address server 120 is implemented as a recording database that receives the network address 160 from the data network gateway 202. Referring to FIG. 2C, the network address server 120 receives a transmission 220 from the data network gateway 202 that includes the network address 160 associated with the network identifier 140 and optionally with the identifier 141 of the destination network. In other words, the transmission 220 may include the address information 152 (see FIG. 1). In the example illustrated, the network address server 120 records the network address 160 and associates it with the network identifier 140 and optionally with the identifier 141 of the destination network. Then, the optional transmission 214 and the transmission 216 may be sent and processed as described above. The optional transmission 214, when sent, may be sent before, at the same time, or after (e.g., N seconds after) the transmission 220 is received. The transmission 216 may be sent any time after (e.g., N seconds after) the transmission 220 is received.

Figure 2D:
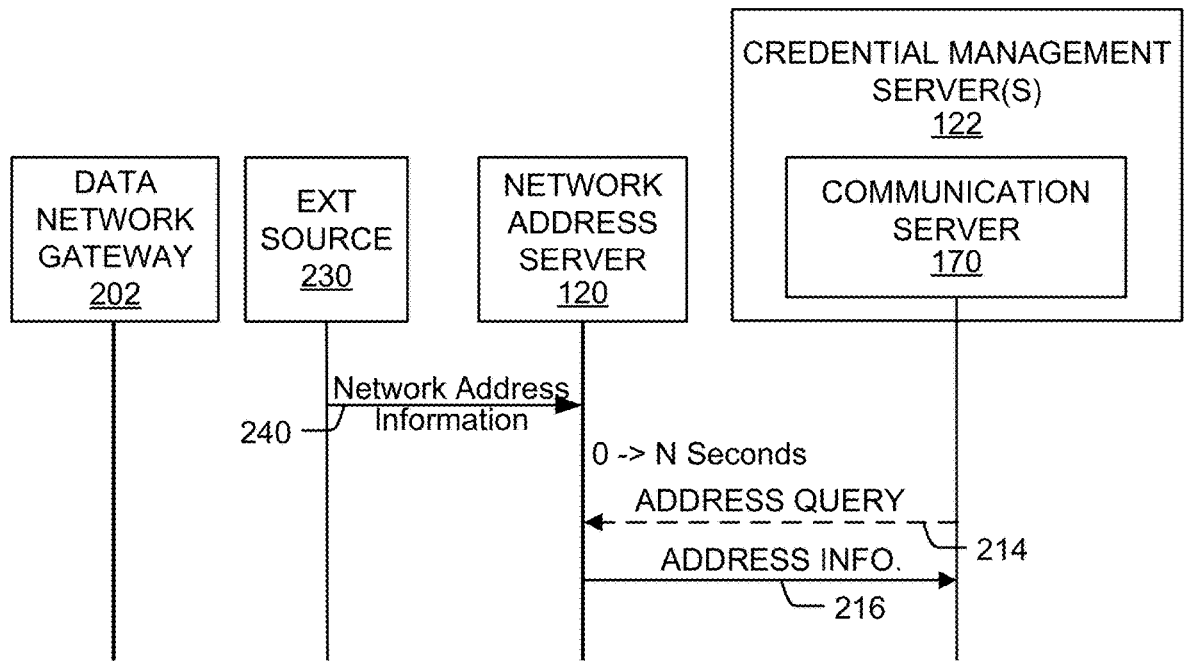

FIG. 2D is a sequence diagram illustrating example communication occurring between an external source 230, the network address server 120, and the credential management server(s) 122 when the network address server 120 is implemented as a recording database that receives the network address 160 from the external source 230. The external source 230 is a source other than the data network gateway 202 and the network address server 120. By way of non-limiting examples, the external source 230 may be a user (e.g., the user 108), a computing device, and the like. Referring to FIG. 2D, the network address server 120 receives a transmission 240 from the external source 230 that includes the network address 160 associated with the network identifier 140 and optionally with the identifier 141 of the destination network. In other words, the transmission 240 may include the address information 152 (see FIG. 1). In the example illustrated, the network address server 120 records the network address 160 and associates it with the network identifier 140 and optionally with the identifier 141 of the destination network. Then, the optional transmission 214 and the transmission 216 may be sent and processed as described above. The optional transmission 214, when sent, may be sent before, at the same time, or after (e.g., N seconds after) the transmission 240 is received. The transmission 216 may be sent any time after (e.g., N seconds after) the transmission 240 is received.

Referring to the FIGS. 3A, when the communication server 170 is made aware of the network address 160 (see FIG. 1), the communication server 170 does not have to wait for the identity component 130 to connect from the client side. Thus, the communication server 170 can deliver the relevant information to the identity component 130 on demand, rather than relying on polling by the identity component 130. In other words, the communication server 170 may push the relevant information to the identity component 130 (e.g., at a time determined by the data server 172).

FIG. 3A is a sequence diagram illustrating example communication occurring during the establishment of the data channel 145 (see FIG. 1) over the network 110 between the communication server 170 and the client device 104 using a three-way handshake process. For example, the three-way handshake process may be implemented as a Transmission Control Protocol ("TCP") three-way handshake process and the network 110 may be implemented as a TCP/IP network. By way of additional non-limiting examples, the handshake process may be implemented as Datagram Transport Layer Security ("DTLS") handshake process or a User Datagram Protocol ("UDP") handshake process. In this example, the identity component 130 may be implemented as an eUICC card.

In FIG. 3A, the handshake process includes three transmissions 308-312. At some point before or during the handshake process, the identity component 130 opens the channel 302 with the modem 132. The channel 302 may be opened in accordance with a Barrier Independent Protocol ("BIP") and may be characterized as being a BIP channel.

To obtain the network address 160 of the client device 104, the communication server 170 may send an address query including the network identifier 140 to the network address server 120 in the optional transmission 214. The network address server 120 may look up the network identifier 140 and return the address information 152 to the communication server 170 in the transmission 216.

Then, the handshake process may be performed. The handshake process may begin when the communication server 170 sends a handshake request to the client device 104 in the transmission 308. By way of a non-limiting example, the handshake request may be implemented as a TCP "SYN" type message. The communication server 170 uses the identifier 141 of the destination network and the network address 160 to send the transmission 308 to the client device 104. The handshake request may specify a full or partial handshake process in accordance with a data transmission protocol (e.g., TCP, UDP, DTLS, TLS, etc.). The client device 104 may respond to the transmission 308 by sending the transmission 310, which may include a handshake request and acknowledgement, to the communication server 170. By way of a non-limiting example, the handshake request and acknowledgement may be implemented as a TCP "SYN+ACK" type message. Then, the communication server 170 may send a handshake acknowledgement to the client device 104 in the transmission 312. By way of a non-limiting example, the handshake acknowledgement may be implemented as a TCP "ACK" type message.

FIG. 3A illustrates a double headed arrow 314 representing a security handshake process, such as Secure Socket Layer/Transport Layer Security ("SSL/TLS") handshake process, as part of the data transmission protocol used to validate the parties to the handshake process. The security handshake process is used to setup a secure channel using TLS, Secure Channel Protocol 81 ("SCP-81"), or another protocol. The modem 132 may forward messages related to the security handshake process from the communication server 170 to the identity component 130 over the channel 302. When the security handshake process is completed, a secure channel 316 is active. The secure channel 316 extends from the communication server 170 through the modem 132 and to the identity component 130.

At this point, the data server 172 may prepare payload data to upload to the client device 104 and send the payload data to the communication server 170 in a transmission 318. For example, the payload data may include one or more of the types of data listed in Table A above. By way of a non-limiting example, the payload data may include an operational profile obtained by the data server 172 for upload to the identity component 130. The data server 172 may prepare the payload data by encrypting it and/or the transmission 318. The payload data and/or the transmission 318 may be encrypted using Secure Channel Protocol 03 ("SCP-03") and/or another payload security protocol.

The communication server 170 may prepare the payload data before uploading the payload data to the modem 132 of the client device 104 in a transmission 320. The communication server 170 may prepare the payload data by encrypting the payload data and/or the transmission 320. The payload data and/or the transmission 320 may be encrypted using SCP-81, TLS, and/or another transport security protocol. The transmission 320 may include the payload data and/or specify one or more operations to be performed by the client device 104 (e.g., by the identity component 130). The transmission 320 is received by the modem 132 and forwarded to the identity component 130 over the channel 302 in a transmission 322.

The identity component 130 may include one or more security domains. For example, in the embodiment illustrated, the identity component 130 includes first and second security domains 330 and 332. The first security domain 330 is for the communication server 170 (e.g., a SM-SR server) and the second security domain 332 is for the data server 172 (e.g., a SM-DP server). The first security domain 330 may remove (e.g., decrypt) any encryption applied by the communication server 170 and send the results to the second security domain 332 in a transmission 334. Then, the second security domain 332 may remove (e.g., decrypt) any encryption applied by the data server 172. The first security domain 330 may be implemented as an Issuer Security Domain—Root ("ISD-R") and the second security domain 332 may be implemented as an Issuer Security Domain—Profile ("ISD-P").

At this point, the identity component 130 may act on the payload data, which is illustrated as an arrow 340 in FIG. 3A. For example, the identity component 130 may set up an operational profile included in the payload data for use by the client device 104.

In FIG. 3A, the handshake process begins when the communication server 170 sends the handshake request in the transmission 308 to the client device 104. Thus, the communication server 170 may initiate a full TCP/TLS handshake process, or a handshake process using another data transmission protocol, such as DTLS or UDP. Further, the identity component 130 connects (e.g., dials) or opens the channel 302 with the modem 132 before the transmission 320 (upload) occurs.

FIG. 3B illustrates an alternate embodiment of the communications shown in FIG. 3A. FIG. 3A is a sequence diagram illustrating example communication occurring during the establishment of the data channel 145 (see FIG. 1) over the network 110 between the communication server 170 and the client device 104 using a two-way handshake process. The embodiment illustrated in FIG. 3B includes the transmission 216 and the channel 302, which is open between the modem 132 and the identity component 130. But, in FIG. 3B, the optional transmission 214 (see FIGS. 2A-2D, 3A, 3C, and 3D) including the address query is omitted. Instead, the network address server 120 provides the network address 160 to the communication server 170 without first receiving the optional transmission 214. Thus, the network address server 120 may push address information (e.g., the network address 160) to the communication server 170 instead of using the optional transmission 214 to request the address information.

Also, in the embodiment illustrated in FIG. 3B, the client device 104 (e.g., the memory 136 and/or the identity component 130) is pre-configured with the optional server handshake details 142 that may be used to skip a portion of the handshake process. Specifically, the transmission 308 (see FIGS. 3A and 3C) may be omitted. Instead, the modem 132 may be listening for a transmission 350 from the communication server 170. The transmission 350 includes both a handshake request and an acknowledgement. By way of a non-limiting example, the handshake request and acknowledgement may be implemented as a TCP "SYN+ACK" type message. After the credential management server(s) 122 sends the transmission 350 to the client device 104, the client device 104 may send a handshake acknowledgement in a transmission 352 to the communication server 170. By way of a non-limiting example, the handshake acknowledgement may be implemented as a TCP "ACK" type message. Then, the security handshake process (represented by the double headed arrow 314) may occur and the remainder of the communications in FIG. 3B may be identical to those having like reference numerals in FIG. 3A.

In the embodiments of both FIGS. 3A and 3B, the identity component 130 opens the channel 302 between the modem 132 and the identity component 130. The identity component 130 also tells the modem 132 how to route data messages to the identity component 130. The modem 132 determines whether data received by the modem 132 is to be delivered to the identity component 130 based on information included in a transmission, such as an addressable port, a protocol identifier, another payload identifier, and the like. Thus, the modem 132 is able to communicate with the identity component 130 via the channel 302.

In some embodiments, the channel 302 may be omitted. Instead, the modem 132 may be preconfigured to route data to the identity component 130 using a predefined connection protocol. Thus, when the credential management server(s) 122 sends a data transmission (via a data transmission protocol) to the modem 132 directly, the modem 132 receives the data transmission, and delivers at least a portion of the data transmission to the identity component 130. The modem 132 may determine whether data received by the modem 132 is to be delivered to the identity component 130 based on information included in the data transmission, such as an addressable port, protocol identifier, another payload identifier, and the like. Thus, the modem 132 is able to communicate with the identity component 130 via the predefined connection protocol. For example, the secure channel 316 may be set up between the communication server 170 and the identity component 130 using the security handshake process (represented by the double headed arrow 314) and the transmission 320 may be sent to the identity component 130 via the modem 132 using the predefined connection protocol. In embodiments omitting the channel 302, the modem 132 is configured to know what to do when data pertaining to the identity component 130 is received, and the identity component 130 is configured to listen for this information.

By way of non-limiting examples, the data may be sent from the modem 132 to the identity component 130 via a toolkit (e.g., a SIM Toolkit), a BIP channel (e.g., the channel 302), an application protocol data unit ("APDU"), an Answer to Reset message ("ATR"), an application programming interface ("API"), a custom API, and/or another modem-to-identity component data interface (e.g., a modem-to-card data interface).

Referring to FIG. 3C, in some embodiments, the communication server 170 may send data directly to the application 138 instead of to the modem 132. In other words, the credential management server(s) 122 may send the data transmission (via a data transmission protocol) to the application 138 directly. For example, in the embodiment illustrated in FIG. 3C, the application 138 is configured to receive the data transmission, and deliver at least a portion of the data transmission to the identity component 130 with the assistance of one or more interfaces of the modem 132. The interface(s) may include an open secure channel request received by the modem 132 in a transmission 370 and sent by the modem 132 to the identity component 130 in a transmission 358. The transmission 358 may be sent using a toolkit (e.g., a SIM Toolkit), a BIP channel (e.g., the channel 302), an APDU, an ATR, an API, a custom API, and/or other modem-to-identity component data interface.

Referring to FIG. 3C, the communication server 170 completes a handshake process with the application 138, which is illustrated by transmissions 360-364. The transmissions 360-364 may be substantially identical to the transmissions 308-312 but are conducted between the communication server 170 and the application 138, instead of between the communication server 170 and the modem 132. Then, the communication server 170 may complete an optional security handshake process (e.g., SSL/TLS), represented as a double headed arrow 366, with the application 138 to open an optional secure channel 368.

Next, the communication server 170 sends the open secure channel request to the application 138 as the transmission 370. The open secure channel request requests the opening of a channel between the communication server 170 and the identity component 130. The application 138 forwards the open secure channel request to the modem 132, which forwards the open secure channel request to the identity component 130 (e.g., to the first security domain 330) in the transmission 358.

Then, the identity component 130 opens the channel 302 (e.g., in accordance with the BIP) with the modem 132. At this point, the communication server 170 may communicate directly with the modem 132, which may communicate with the identity component 130 over the channel 302.

Then, the communication server 170 completes the handshake process with the modem 132, which is illustrated by the transmissions 308-312 described above. Next, the communication server 170 may complete a security handshake process (e.g., SSL/TLS), represented as a double headed arrow 372, with the identity component 130 to open a secure channel 374. The secure channel 374 extends between the communication server 170 and the identity component 130 over the channel 302.

At this point, the transmission 318 may be completed. Then, the communication server 170 uploads the payload data to the application 138 in a transmission 323. After the application 138 receives the transmission 323, the application 138 may forward the payload data to the modem 132 and may tell the modem 132 to route data message to the identity component 130 in a transmission 324. The application 138 and/or the modem 132 may determine whether the payload data is to be delivered to the identity component 130 based on information included in a transmission, such as an addressable port, protocol identifier, another payload identifier, and the like. Next, the transmission 334 may be completed and the identity component 130 may act on the payload data, which is illustrated as the arrow 340 in FIG. 3C.

Like in FIGS. 3A and 3B, the communication server 170 may initiate a full TCP/TLS handshake process, or a handshake process using another data transmission protocol, such as DTLS or UDP. Further, the identity component 130 connects (e.g., dials) or opens the channel 302 with the modem 132 before the transmission 323 (upload) occurs. But the communication server 170 sends the transmission 323 with the payload data to the application 138. The modem 132 may be used by the application 138, which is running on the client device 104 as a means for interfacing with the network 110. In FIG. 3C, the identity component 130 does not connect (or pre-dial) or open the channel 302, the application 138 is configured to know what to do when data pertaining to the identity component 130 is received, and the modem 132 is configured to know what to do when data pertaining to the identity component 130 is received, and the identity component 130 is instructed to open the channel 302 with the modem 132.

In some embodiments, the transmission 358 and the channel 302 may be omitted. Instead, the modem 132 may be preconfigured to route data to the identity component 130 using the predefined connection protocol described above. In such embodiments, the secure channel 374 may be set up between the communication server 170 and the identity component 130 using the security handshake process (represented by the double headed arrow 372) and the transmission 323 may be sent to the identity component 130 via the modem 132 using the predefined connection protocol. In embodiments omitting the channel 302, the modem 132 is configured to know what to do when data pertaining to the identity component 130 is received, and the identity component 130 is configured to listen for this information. By way of non-limiting examples, the modem 132 may send the data to the identity component 130 via a toolkit (e.g., a SIM Toolkit), a BIP channel (e.g., the channel 302), an APDU, an ATR, an API, a custom API, and/or another modem-to-identity component data interface (e.g., a modem-to-card data interface). The modem 132 may determine whether data received by the modem 132 is to be delivered to the identity component 130 based on information included in the data transmission, such as an addressable port, protocol identifier, another payload identifier, and the like.

FIG. 3D illustrates another example in which the credential management server(s) 122 delivers the data transmission via a data transmission protocol to the application 138 directly. The application 138 receives the data transmission, and delivers at least a portion of the data transmission to the identity component 130 via the modem 132. The modem 132 is preconfigured to route data to the identity component 130 using the predefined connection protocol described above. The data transmission may be sent through the modem 132 using a toolkit (e.g., a SIM Toolkit), a BIP channel (e.g., the channel 302), an APDU, an ATR, an API, a custom API, a modem-to-identity component data interface, and/or an application-to-identity component data interface.

Referring to FIG. 3D, the communication server 170 completes the handshake process with the application 138 via the transmissions 360-364 described above. Then, the communication server 170 completes the security handshake process (e.g., SSL/TLS), represented as the double headed arrow 366, with the application 138 to open the secure channel 368. In this embodiment, the security handshake process is not optional. At this point, the transmissions 318 and 323 may be completed. After the application 138 receives the transmission 323, the application 138 may forward the payload data to the modem 132 in a transmission 326 and may tell the modem 132 to route data message to the identity component 130. The modem 132 may route the data message to the identity component 130 in a transmission 328. The application 138 and/or the modem 132 may determine whether the payload data is to be delivered to the identity component 130 based on information included in a transmission, such as an addressable port, protocol identifier, another payload identifier, and the like. As mentioned above, the modem 132 is preconfigured to route data to the identity component 130 in the transmission 328 using the predefined connection protocol described above. Next, the transmission 334 may be completed and the identity component 130 may act on the payload data, which is illustrated as the arrow 340 in FIG. 3D. Thus, the payload data is received by the identity component 130 after having been sent by (e.g., pushed from) the credential management server(s) 122 to the identity component 130. As mentioned above, the credential management server(s) 122 uses the address information 152 (e.g., IP address) received from the network address server 120 (e.g., a RADIUS server) to send the data transmission.

In the embodiment illustrated in FIG. 3D, the application 138 is configured to receive the data transmission, and deliver at least a portion of the data transmission to the identity component 130, without the assistance of the open secure channel request sent as the transmission 370 (see FIG. 3C). As mentioned above, the open secure channel request may be implemented as a BIP interface (e.g., an Open Channel BIP interface) of the modem 132. However, the application 138 may use another interface of the modem 132, such as an open channel request that may be sent by a toolkit (e.g., a SIM Toolkit), a BIP channel (e.g., the channel 302), an APDU, an ATR, an API, a custom API, and/or other application-to-identity component data interface.

The modem 132 may be used by the application 138 running on the client device 104 as a means to interface with the network 110. In FIG. 3D, the identity component 130 does not connect (or pre-dial) or open the channel 302, the application 138 is configured to know what to do when data pertaining to the identity component 130 is received, and the identity component 130 is configured to listen for this information.

In the embodiments illustrated in FIGS. 3C and 3D, the application 138 routes the data transmission to the identity component 130 via the modem 132. In alternate embodiments, the application 138 may route the data transmission to the identity component 130 without the modem 132. In other words, in FIG. 3C, the transmission 324 may be replaced with a transmission (not shown) that extends from the application 138 to the identity component 130 and does not pass through the modem 132. Similarly, in FIG. 3D, the transmissions 326 and 328 may be replaced with a transmission (not shown) that extends from the application 138 to the identity component 130 and does not pass through the modem 132.

Depending upon the implementation details, the credential management server(s) 122 may deliver information (e.g., in a data transmission) to the identity component 130 using at least a particular one of a number of different endpoints by addressing the information to the particular endpoint. For example, the endpoints may include the identity component 130, the modem 132, the application 138. FIG. 3A illustrates an embodiment in which the information is sent to the identity component 130 as an endpoint. In FIG. 3A, the information may be sent to the identity component 130 via a SCP-81 connection via TCP/BIP modem support in the identity component 130 (e.g., eSIM). Alternatively, the channel 302 may be omitted and a data transmission protocol may be used to address the modem 132 as the endpoint. FIGS. 3C and 3D illustrate embodiments in which the information is sent to the application 138 as the endpoint. As explained above, the application 138 forwards the information to the identity component 130.

FIGS. 4A and 4B depict a flow diagram of a method 400 performed by the system 100 (see FIG. 1). Referring to FIGS. 3A and 3B, in first block 402 (see FIG. 4A), the data server 172 of the credential management server(s) 122 identifies information to upload to the identity component 130 of the client device 104. In block 404, the communication server 170 obtains the network address 160 (see FIG. 1) of the client device 104 using any of the methods illustrated in FIGS. 2A-2D. For example, referring to FIG. 2A, the communication server 170 may query the data network gateway 202 for the network address 160 (see FIG. 1). By way of another non-limiting example, referring to FIG. 2B, the communication server 170 may create the network address 160 and forward the network address 160 to the data network gateway 202 for delivery to the client device 104. By way of yet another non-limiting example, referring to FIG. 2C, the communication server 170 may simply receive the network address 160 (see FIG. 1) from the data network gateway 202 without first requesting the network address 160 from the data network gateway 202. By way of yet another non-limiting example, referring to FIG. 2D, the communication server 170 may simply receive the network address 160 (see FIG. 1) from the external source 230 without first requesting the network address 160 from the external source 230. Referring to FIG. 4A, the order of the blocks 402 and 404 may be reversed.

Referring to FIG. 3A, in decision block 406 (see FIG. 4A), the communication server 170 identifies or selects an endpoint of the client device 104 to which to connect. The endpoints may include the identity component 130, the modem 132, or the application 138. When the communication server 170 selects the identity component 130 as the endpoint in decision block 406, the communication server 170 advances to optional block 408 (see FIG. 4A).

In optional block 408 (see FIG. 4A), the modem 132 opens up the channel 302 with the identity component 130. The optional block 408 may be performed at any time before the security handshake process is performed in block 412 (see FIG. 4A).

In block 410 (see FIG. 4A), the communication server 170 performs the handshake process with the modem 132. By way of a non-limiting example, during the handshake process performed in block 410, the communication server 170 may send the transmissions 308 and 312 and the modem 132 may send the transmission 310. By way of another non-limiting example, referring to FIG. 3B, the communication server 170 may send the transmission 350 to the modem 132, and the modem 132 may send the transmission 352 to the communication server 170 during the handshake process performed in block 410. Referring to FIG. 4A, the order of the blocks 408 and 410 may be reversed. When this is the case, the communication server 170 advances to block 410 (see FIG. 4A) after selecting the modem 132 as the endpoint in decision block 406.

In block 412 (see FIG. 4A), the communication server 170 performs the security handshake process (represented as the double headed arrow 314 in FIGS. 3A and 3B) with the identity component 130 to establish the secure channel 316 between the communication server 170 and the identity component 130. In embodiments in which the channel 302 was opened in optional block 408, the secure channel 316 extends over the channel 302. In embodiments omitting the optional block 408, the predefined connection protocol may be used to establish the secure channel 316. In embodiments omitting the channel 302, the modem 132 is configured to know what to do when data pertaining to the identity component 130 is received, and the identity component 130 is configured to listen for this information.

Then, in block 414 (see FIG. 4A), the data server 172 sends the information to the communication server 170 in the transmission 318, and the communication server 170 uploads the information (payload data) to the modem 132 in the transmission 320.

In block 416 (see FIG. 4A), the modem 132 forwards the information to the identity component 130 in the transmission 322. Then, in block 418 (see FIG. 4A), the identity component 130 processes the information (payload data). For example, the first security domain 330 may remove (e.g., decrypt) any encryption applied by the communication server 170 and send the results to the second security domain 332 in the transmission 334. Then, the second security domain 332 may remove (e.g., decrypt) any encryption applied by the data server 172. The identity component 130 may act on the payload data, which is illustrated as the arrow 340 in FIGS. 3A and 3B. For example, the identity component 130 may set up an operational profile included in the payload data for use by the client device 104. The method 400 (see FIGS. 4A and 4B) terminates after block 418.

When the communication server 170 selects the modem 132 as the endpoint in decision block 406 (see FIG. 4A), establishing the channel 302 is omitted. Instead, the modem 132 is configured to listen for information pertaining to the identity component 130, and to know what to do with such information. For example, the modem 132 may send the information to the identity component 130 via a toolkit (e.g., a SIM Toolkit), a BIP channel (e.g., the channel 302), an APDU, an ATR, an API, a custom API, and/or other modem-to-identity component data interface.

When the modem 132 has been selected as the endpoint, after the decision block 406, the communication server 170 advances to block 420 (see FIG. 4A) whereat the communication server 170 performs the handshake process with the modem 132. By way of a non-limiting example, during the handshake process in block 420, the communication server 170 may send the transmissions 308 and 312 to the modem 132, and the modem 132 may send the transmission 310 to the communication server 170. By way of another non-limiting example, referring to FIG. 3B, the communication server 170 may send the transmission 350 to the modem 132, and the modem 132 may send the transmission 352 to the communication server 170 during the handshake process in block 420. Then, in block 422 (see FIG. 4A), the communication server 170 performs a security handshake process (represented as the double headed arrow 314 in FIGS. 3A and 3B) with the identity component 130 to establish the secure channel 316 between the communication server 170 and the identity component 130. Then, the data server 172 advances to block 414 and sends the information to the communication server 170 in the transmission 318, and the communication server 170 uploads the information (payload data) to the modem 132 in the transmission 320. The method 400 then advances as described above with respect to blocks 416 and 418. The method 400 (see FIGS. 4A and 4B) terminates after block 418.

Referring to FIG. 3C, when the communication server 170 selects the application 138 as the endpoint in decision block 406 (see FIG. 4A), in block 424 (see FIG. 4B), the communication server 170 performs the handshake process with the application 138. By way of a non-limiting example, during the handshake process in block 424, the communication server 170 may send the transmissions 360 and 364 to the application 138, and the application 138 may send the transmission 362 to the communication server 170. By way of another non-limiting example, referring to FIG. 3B, the communication server 170 may send a transmission like the transmission 350 to the application 138 and the application 138 may send a transmission like the transmission 352 to the communication server 170 during the handshake process in block 424.

In optional block 426 (see FIG. 4B), the communication server 170 may perform a security handshake process (represented as the double headed arrow 366 in FIGS. 3C and 3D) with the application 138 to establish the secure channel 368 between the communication server 170 and the application 138 over the network 110 (see FIG. 1).

Next, in block 432 (see FIG. 4B), the communication server 170 downloads the information to the application 138 in the transmission 323.

In decision block 428 (see FIG. 4B), the communication server 170 decides whether to request that the modem 132 open the channel 302 with the identity component 130. The decision in decision block 428 is "YES" when the communication server 170 decides to request that the modem 132 open the channel 302 with the identity component 130. Otherwise, the decision in decision block 428 is "NO."

Referring to FIG. 3D, when the decision in decision block 428 (see FIG. 4B) is "NO," the application 138 advances to decision block 434. In decision block 434 (see FIG. 4B), the application 138 decides whether to send the information to the modem 132 or the identity component 130.

When the application 138 decides to send the information to the modem 132 in decision block 434 (see FIG. 4B), in block 436 (see FIG. 4B), the application 138 sends the information to the modem 132 in the transmission 326 (see FIG. 3D). Then, in block 416 (see FIG. 4A), the modem 132 sends the information to the identity component 130 in the transmission 328 (see FIG. 3D). Next, in block 418 (see FIG. 4A), the identity component 130 processes the information (payload data). The method 400 (see FIGS. 4A and 4B) terminates after block 418.

When the application 138 decides to send the information to the identity component 130 in decision block 434 (see FIG. 4B), in block 438 (see FIG. 4B), the application 138 sends the information to the identity component 130 in a transmission (not shown) that does not pass through the modem 132. Next, in block 418 (see FIG. 4A), the identity component 130 processes the information (payload data). The method 400 (see FIGS. 4A and 4B) terminates after block 418.

Referring to FIG. 3C, when the decision in decision block 428 (see FIG. 4B) is "YES," in block 440 (see FIG. 4B), the communication server 170 sends an open secure channel request to the application 138 as the transmission 370. The application 138 forwards the open secure channel request to the modem 132, which forwards the open secure channel request to the identity component 130 in the transmission 358.

In block 442 (see FIG. 4B), the modem 132 and/or the identity component 130 open(s) the channel 302 in response to the transmission 358. For example, the modem 132 may open the channel 302 with the identity component 130. In other words, the modem 132 may establish a channel connection. Alternatively, the modem 132 may pass along information to the identity component 130 that allows the identity component 130 to open the channel 302. In such embodiments, the identity component 130 establishes the channel connection.

In block 444 (see FIG. 4B), the communication server 170 performs the handshake process with the modem 132. By way of a non-limiting example, during the handshake process in block 444, the communication server 170 may send the transmissions 308 and 312 to the modem 132, and the modem 132 may send the transmission 310 to the communication server 170. By way of another non-limiting example, referring to FIG. 3B, the communication server 170 may send the transmission 350 to the modem 132, and the modem 132 may send the transmission 352 to the communication server 170 during the handshake process in block 444.

In block 446 (see FIG. 4B), the communication server 170 performs the security handshake process (represented as the double headed arrow 372 in FIG. 3C) with the identity component 130 to establish the secure channel 374 between the communication server 170 and the identity component 130 over the channel 302. The security handshake process may be implemented as an SSL/TLS process.

Then, the application 138 advances to block 436 (see FIG. 4B), forwards the payload data to the modem 132, and instructs the modem 132 to route the payload data to the identity component 130 in the transmission 324 (see FIG. 3C). Next, the method 400 proceeds as described above with respect to blocks 416 and 418 (see FIG. 4A). The method 400 (see FIGS. 4A and 4B) terminates after block 418.

Computing Device

FIG. 5 is a block diagram of hardware and an operating environment in conjunction with which implementations of at least some of the computing devices of the system 100 illustrated in FIG. 1, such as the client devices 102-106, the credential management server(s) 122, and/or the network address server 120 may be practiced. The description of FIG. 5 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including the mobile communication device 600 (see FIG. 6), hand-held devices, multiprocessor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network (e.g., the network 110 illustrated in FIG. 1). In a distributed computing environment, program modules may be located in both local and remote memory storage devices.

The exemplary hardware and operating environment of FIG. 5 includes a general-purpose computing device in the form of the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, a blade computer, and the like.

The computing device 12 includes the system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random-access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device may also be connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 5 include a local-area network (LAN) 51 and a wide-area network (WAN) 52. Such networking environments are commonplace in offices, enterprise-wide computer networks, intranets and the Internet. The network 110 (see FIG. 1) may be implemented using any of the aforementioned networks.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the LAN 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions (e.g., the instructions 148 illustrated in FIG. 1, the instructions 168 illustrated in FIG. 1, and/or the application 138 illustrated in FIGS. 1 and 3A-3D) that when executed by one or more processors cause the one or more processors to perform all or portions of the methods described above, such as the method 400 (see FIGS. 4A and 4B). The system memory 22 may also store data, such as the data 150 (see FIG. 1) and/or the data 169 (see FIG. 1). Such instructions and/or data may be stored on one or more non-transitory computer-readable or processor readable media.

Mobile Communication Device

FIG. 6 is a functional block diagram illustrating the mobile communication device 600 that may be used to implement one or more of the client devices 102-106 (see FIG. 1) of the system 100 (see FIG. 1). The mobile communication device 600 may be implemented as a cellular telephone, smart phone, a tablet computing device, and the like. By way of a non-limiting example, the mobile communication device 600 may be implemented as a smartphone executing 105 or Android OS. By way of additional non-limiting examples, the mobile communication device 600 may be implemented as a device (e.g., a vehicle) configured for M2M communication and/or to communicate on the IoT.

The mobile communication device 600 includes the central processing unit ("CPU") 610. Those skilled in the art will appreciate that the CPU 610 may be implemented as a conventional microprocessor, application specific integrated circuit ("ASIC"), digital signal processor ("DSP"), programmable gate array ("PGA"), or the like. The mobile communication device 600 is not limited by the specific form of the CPU 610.

The mobile communication device 600 also contains the memory 612. The memory 612 may store instructions and data to control operation of the CPU 610. The memory 612 may include random access memory, ready-only memory, programmable memory, flash memory, and the like. The mobile communication device 600 is not limited by any specific form of hardware used to implement the memory 612. The memory 612 may also be integrally formed in whole or in part with the CPU 610.

The mobile communication device 600 also includes the identity component 130 (see FIGS. 1 and 3A-3D), such as an eSIM card (not shown). As mentioned above, the functionality of the identity component 130 described above may be integrated into silicon. For example, the identity component 130 may be implemented as an eSIM, an iSIM, a universal integrated circuit card ("UICC"), an embedded UICC ("eUICC"), a processor (e.g., a central processing unit 610), and/or memory (e.g., memory 612) of the client device 104 (see FIG. 1).

The mobile communication device 600 also includes conventional components, such as a display 614, a keypad or keyboard 616, and a camera or video capture device 618. For example, the display 614 may be implemented as conventional touch screen display. These are conventional components that operate in a known manner and need not be described in greater detail. Other conventional components found in wireless communication devices, such as USB interface, Bluetooth interface, infrared device, and the like, may also be included in the mobile communication device 600. For the sake of clarity, these conventional elements are not illustrated in the functional block diagram of FIG. 6.

The display 614, the keyboard 616, and the camera or video capture device 618 are operable to receive user input and selections. Together the input and display devices may be described as providing a user interface. The user interface may be configured to display a web interface and receive input entered into or in response to the web interface.

The mobile communication device 600 also includes a network transmitter 622 such as may be used by the mobile communication device 600 for normal network wireless communication with a base station (not shown). FIG. 6 also illustrates a network receiver 620 that operates in conjunction with the network transmitter 622 to communicate with the base station (not shown). In a typical embodiment, the network transmitter 622 and network receiver 620 are implemented as a network transceiver 626. The network transceiver 626 is connected to an antenna 628. Operation of the network transceiver 626 and the antenna 628 for communication with a wireless network (not shown) is well-known in the art and need not be described in greater detail herein.

The mobile communication device 600 may also include a conventional geolocation module (not shown) operable to determine the current location of the mobile communication device 600.

The various components illustrated in FIG. 6 are coupled together by the bus system 630. The bus system 630 may include an address bus, data bus, power bus, control bus, and the like. For the sake of convenience, the various busses in FIG. 6 are illustrated as the bus system 630.

The memory 612 may store instructions (e.g., all or portions of the application 138 illustrated in FIGS. 1 and 3A-3D) executable by the CPU 610. When executed by the CPU 610, the instructions may cause the CPU 610 to perform all or portions of the methods described above, such as the method 400 (see FIGS. 4A and 4B). The memory 612 may also store data, such as the data received from the credential management server(s) 122 (see FIGS. 1 and 3A-3D). Such instructions and/or data may be stored on one or more non-transitory computer or processor readable media.

Alternatively, the identity component 130 (see FIGS. 1 and 3A-3D) may include memory (not shown) that stores the instructions and/or data. The identity component 130 may also include a processor (not shown) configured to execute the instructions. When executed by the processor, the instructions may cause the processor to perform all or portions of the methods described above, such as the method 400 (see FIGS. 4A and 4B). Such instructions and/or data may be stored on one or more non-transitory computer or processor readable media.

At least one embodiment of the disclosure can be described in view of the following clauses:

1. A credential management server comprising at least one processor, and a memory storing instructions that are executable by the at least one processor, the instructions, when executed by the at least one processor, causing the at least one processor to (a) obtain network address information from a network address server, the network address information being associated with a client device comprising an identity component, (b) initiate a data channel with the identity component using the network address information, the data channel being initiated other than by a Short Message Service ("SMS") message, and (c) send data to the identity component over the data channel.

2. The credential management server of clause 1, wherein initiating the data channel comprises performing a handshake process with a modem installed in the client device or an application executing on the client device.

3. The credential management server of clause 2, wherein the instructions, when executed by the at least one processor, cause the at least one processor to perform a security handshake process with the identity component.

4. The credential management server of any one of the clauses 1-3, wherein initiating the data channel comprises performing a first handshake process with an application executing on the client device, and the instructions, when executed by the at least one processor, cause the at least one processor to send an open channel request to a modem installed in the client device.

5. The credential management server of clause 4, wherein the instructions, when executed by the at least one processor, cause the at least one processor to perform a first security handshake process with the application.

6. The credential management server of clause 5, wherein the instructions, when executed by the at least one processor, cause the at least one processor to perform a second handshake process with the modem.

7. The credential management server of clause 6, wherein the instructions, when executed by the at least one processor, cause the at least one processor to perform a second security handshake process with the identity component.

8. The credential management server of any one of the clauses 1-7, wherein the network address information comprises an Internet Protocol ("IP") address of the client device.

9. A network modem to be installed within a client device comprising an identity component, the network modem comprising: circuitry to be connected to the identity component, the circuitry to receive inbound information from a credential management server over a data channel, and pass the inbound information to the identity component.

10. The network modem of clause 9, wherein the circuitry is to be connected to a wireless receiver and to receive the inbound information from the wireless receiver.

11. The network modem of clause 9 or clause 10, wherein the circuitry comprises: at least one processor; and a memory storing instructions that are executable by the at least one processor, the instructions, when executed by the at least one processor, causing the at least one processor to set up a channel between the network modem and the identity component.

12. The network modem of any one of the clauses 9-11, wherein the instructions, when executed by the at least one processor, cause the at least one processor to determine the inbound information is to be passed to the identity component based on routing information included in the inbound information.

13. The network modem of clause 12, wherein the routing information comprises an addressable port, a protocol identifier, or a payload identifier.

14. The network modem of any one of the clauses 9-13, wherein the instructions, when executed by the at least one processor, cause the at least one processor to receive at least one instruction from an application executing on the identity component, the at least one instruction instructing the at least one processor to route the inbound information to the identity component.

15. A method performed by a client device comprising an identity component, the method comprising: receiving inbound information from a credential management server over a data channel; and providing the inbound information to the identity component.

16. The method of clause 15, further comprising: performing a handshake process with the credential management server, the handshake process having been initiated by the credential management server other than by sending a Short Message Service ("SMS") message to the client device.

17. The method of clause 16, further comprising: performing a security handshake process with the credential management server.

18. The method of clause 16 or clause 17, wherein the client device comprises a modem, and the method further comprises: receiving an open channel request from the credential management server; and sending the open channel request to the modem.

19. An identity component comprising: circuitry to connect to a data channel initiated by a credential management server, the circuitry to receive information from the credential management server over the data channel, the data channel being initiated by the credential management server other than by a Short Message Service ("SMS") message.

20. The identity component of clause 19, wherein the circuitry is to be connected to a modem and to receive the information over the data channel via the modem.

21. The identity component of clause 19 or clause 20, wherein the circuitry comprises memory to store a network identifier to be provided to the credential management server before the credential management server initiates the data channel.

22. The identity component of any one of the clauses 19-21, wherein the identity component is an embedded subscriber identity module ("eSIM") card, a Universal Integrated Circuit Card ("UICC"), an embedded UICC ("eUICC"), a portion of a System on a Chip ("SoC"), an integrated eUICC ("ieUICC"), an integrated subscriber identity module ("iSIM"), a portion of a processor, or a portion of memory.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

As used herein, a term joining items in a series (e.g., the term "or," the term "and," or the like) does not apply to the entire series of items, unless specifically stated otherwise or otherwise clearly contradicted by context. For example, the phrase "a plurality of A, B, and C" (with or without the Oxford comma) refers to a subset including at least two of the recited items in the series. Thus, the phrase refers to (1) at least one A and at least one B but not C, (2) at least one A and at least one C but not B, (3) at least one B and at least one C but not A, and (4) at least one A and at least one B and at least one C. Similarly, the phrase "a plurality of A, B, or C" (with or without the Oxford comma) refers to a subset including at least two of the recited items in the series. Thus, this phrase also refers to (1) at least one A and at least one B but not C, (2) at least one A and at least one C but not B, (3) at least one B and at least one C but not A, and (4) at least one A and at least one B and at least one C.

By away of another example, Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A credential management server comprising:
   at least one processor; and
   a memory storing instructions that are executable by the at least one processor, the instructions, when executed by the at least one processor, causing the at least one processor to:
   identify data to be pushed to a client device connected to a network using an embedded subscriber identity module ("eSIM") card,
   obtain, via the network, network address information associated with the client device from a network address server,
   initiate, over the network and after the network address information is obtained, a data channel with the eSIM card using the network address information, and
   send the data to the eSIM card over the data channel.

2. The credential management server of claim 1, wherein initiating the data channel comprises performing a handshake process with a modem installed in the client device or an application executing on the client device.

3. The credential management server of claim 2, wherein the instructions, when executed by the at least one processor, cause the at least one processor to perform a security handshake process with the eSIM card.

4. The credential management server of claim 1, wherein initiating the data channel comprises performing a first handshake process with an application executing on the client device, and
   the instructions, when executed by the at least one processor, cause the at least one processor to send an open channel request to a modem installed in the client device.

5. The credential management server of claim 4, wherein the instructions, when executed by the at least one processor, cause the at least one processor to perform a first security handshake process with the application.

6. The credential management server of claim 5, wherein the instructions, when executed by the at least one processor, cause the at least one processor to perform a second handshake process with the modem.

7. The credential management server of claim 6, wherein the instructions, when executed by the at least one processor, cause the at least one processor to perform a second security handshake process with the eSIM card.

8. The credential management server of claim 1, wherein the network address information comprises an Internet Protocol ("IP") address of the client device.

9. A network modem comprising:
   circuitry connected to an embedded subscriber identity module ("eSIM") card, after connecting to a network, the circuitry to establish a data channel over the network with the eSIM card that was initiated by a credential management server, and pass inbound information to the eSIM card received over the data channel from the credential management server.

10. The network modem of claim 9, wherein the circuitry is to be connected to a wireless receiver and to receive the inbound information from the wireless receiver.

11. The network modem of claim 9, wherein the circuitry comprises:
   at least one processor; and
   a memory storing instructions that are executable by the at least one processor, the instructions, when executed by the at least one processor, causing the at least one processor to set up a channel between the circuitry and the eSIM card.

12. The network modem of claim 11, wherein the instructions, when executed by the at least one processor, cause the at least one processor to determine the inbound information is to be passed to the eSIM card based on routing information included in the inbound information.

13. The network modem of claim 12, wherein the routing information comprises an addressable port, a protocol identifier, or a payload identifier.

14. The network modem of claim 11, wherein the instructions, when executed by the at least one processor, cause the at least one processor to receive at least one instruction from an application executing on the eSIM card, the at least one instruction instructing the at least one processor to route the inbound information to the eSIM card.

15. A method performed by a client device comprising an embedded subscriber identity module ("eSIM") card, the method comprising:
   establishing a connection with a network;
   establishing a data channel over the network initiated with the eSIM card by a credential management server;
   receiving inbound information from the credential management server over the data channel; and
   providing the inbound information to the eSIM card.

16. The method of claim 15, further comprising:
   performing a handshake process with the credential management server, the handshake process having been initiated by the credential management server.

17. The method of claim 16, further comprising:
   performing a security handshake process with the credential management server.

18. The method of claim 16, wherein the client device comprises a modem, and the method further comprises:
   receiving an open channel request from the credential management server; and
   sending the open channel request to the modem.

19. An embedded subscriber identity module ("eSIM") card comprising:
   circuitry, while connected to a network, to establish a data channel initiated by a credential management server over the network between the eSIM card and the credential management server, the circuitry to receive information from the credential management server over the data channel.

20. The eSIM card of claim 19, wherein the circuitry is to be connected to a modem and to receive the information over the data channel via the modem.

21. The eSIM card of claim 19, wherein the circuitry comprises memory to store a network identifier to be provided to the credential management server over the network before the credential management server initiates the data channel.

* * * * *